United States Patent [19]

Staats

[11] 3,767,883

[45] Oct. 23, 1973

[54] CONTROL AND POWER SUPPLY SYSTEMS FOR MAGNETRON DEVICES

[75] Inventor: James E. Staats, Louisville, Ky.

[73] Assignee: General Electric Company

[22] Filed: Mar. 20, 1962

[21] Appl. No.: 181,144

[52] U.S. Cl.................. 219/10.55, 321/15, 328/262
[51] Int. Cl. ............................................. H05b 9/06
[58] Field of Search...................... 315/39; 328/262; 219/10.55; 321/15

[56] References Cited
UNITED STATES PATENTS

| | | | |
|---|---|---|---|
| 2,929,905 | 3/1960 | Hahn | 219/10.55 |
| 3,121,835 | 2/1964 | Diebold | 321/15 |
| 2,632,090 | 3/1953 | Revercomb et al. | 219/10.55 |
| 2,744,990 | 5/1956 | Schroeder | 219/10.55 |

Primary Examiner—J. V. Truhe
Assistant Examiner—Hugh D. Jaeger
Attorney—Prangley, Clayton, Mullin, Dithmar & Vogel

[57] ABSTRACT

An R.F. generator for a microwave heating apparatus includes a low plate voltage magnetron device in combination with a power supply system comprising a voltage doubler and rectifier circuit consisting essentially of capacitors and rectifiers providing a galvanic connection between the magnetron and a single phase, 60 Hz., 220–250 volt line-to-line, three-wire Edison supply source, and supplying D.C. plate voltage of approximately 570 volts to the input terminals of the magnetron which in turn produces R.F. power in the range of 700 watts at 915 mHz. A timer-control circuit is provided to insure heating of the magnetron cathode at a first rate prior to the application of plate voltage and at a second rate after the application of plate voltage.

33 Claims, 9 Drawing Figures

PATENTED OCT 23 1973

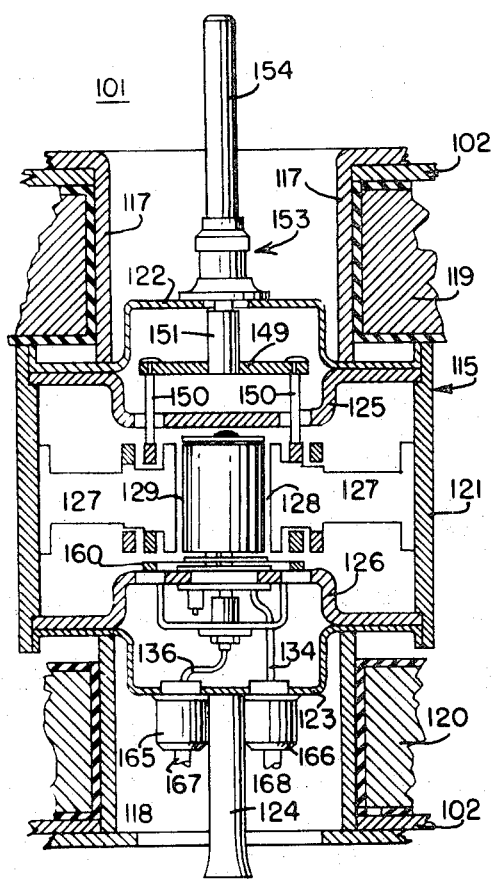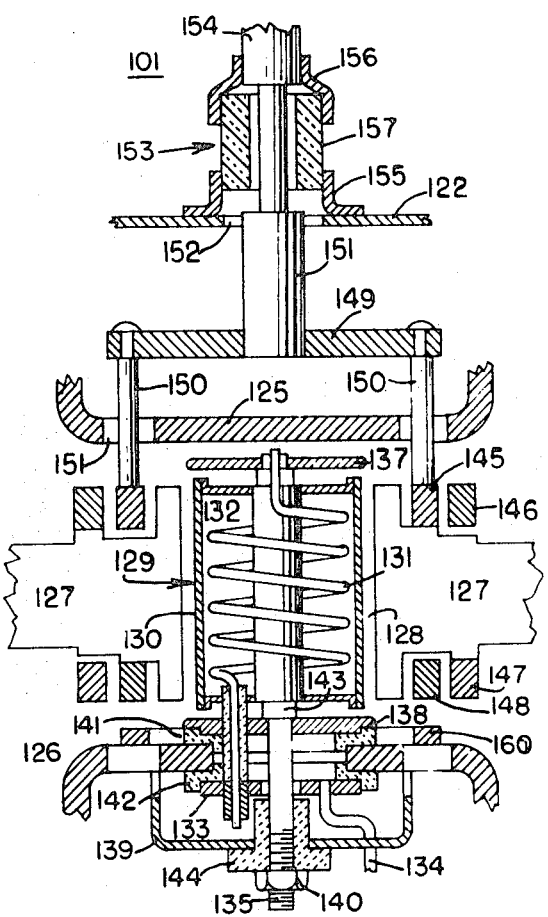

CONTROL AND POWER SUPPLY SYSTEMS FOR MAGNETRON DEVICES

The present invention relates to magnetron devices, and more particularly to control and power supply systems therefor.

In the copending application of James E. Staats, Ser. No. 105,983, filed Apr. 27, 1961, and now abandoned, there is disclosed a crossed-field electric discharge device in the form of a multiple cavity magnetron device that is especially constructed and arranged to achieve stable and efficient operation at anode-cathode voltages of relatively low amplitude, thereby rendering the magnetron device particularly well suited for incorporation in electonic cooking apparatus designed for home use. More particularly, this magnetron device is designed to oscillate at an ultra-high frequency of about 915 Mc, employing anode-cathode voltages in the general range 250 to 1,000 volts d.c., with corresponding R.F. power outputs in the general range 80 to 2,400 watts. Specifically: at a plate voltage of about 290 volts d.c., this device has a continuous R.F. power output of about 100 watts at the ultra-high frequency of 915 Mc; at a plate voltage of about 570 volts d.c., this device has a continuous R.F. power output of about 700 watts at the ultra-high frequency of 915 Mc; and at a plate voltage of about 1,000 volts d.c., this device has a peak R.F. power output of about 2,400 watts at the ultra-high frequency of 915 Mc.

Accordingly, it is a general object of the present invention to provide a power supply system for a crossed-field electric discharge device of the character described, wherein the power supply system is of exceedingly simple and economical connection and arrangement.

Another object of the invention is to provide a power supply circuit for a low plate voltage magnetron device, wherein the power supply circuit is readily operable from a low frequency low voltage a.c. supply source, without the necessity of power transformers, or other expensive components.

Another object of the invention is to provide a power supply circuit of the character described, wherein the a.c. supply source therefor is of a frequency of about 60 cycles and the R.M.S. voltage thereof is in the general range 220 to 250 volts; whereby the a.c. supply source may comprise a conventional single phase 3-wire Edison network of the type ordinarily employed in home wiring systems.

Another object of the invention is to provide a power supply circuit of the character described, wherein the same comprises a converter that consists essentially of an assembly of capacitors and rectifiers and constituting a voltage doubler and rectifier circuit, so as to supply to the input terminals of the magnetron device a d.c. voltage of sufficient amplitude to obtain entirely satisfactory operation thereof.

Another object of the invention is to provide a power supply circuit of the character described that includes a power selector switch having a high position connecting the line-to-line voltage of the a.c. Edison supply source to the input of the voltage doubler and rectifier circuit and having a low position connecting the line-to-neutral voltage of the a.c. Edison supply source to the input of the voltage doubler and rectifier circuit, thereby selectively to control the d.c. output voltage of the voltage doubler and rectifier circuit and consequently the R.F. power output of the magnetron device.

Another object of the invention is to provide a control and power supply circuit for a magnetron device that includes a program controller that is manually presettable in accordance with a desired variable time interval and that is timer operated in accordance with the preset time interval, and circuits that are governed by the program controller to insure proper heating of the cathode of the magnetron device incident to initiation of operation thereof and prior to the application of plate voltage thereto and to insure proper operation of the magnetron device during the present time interval mentioned.

Another object of the invention is to provide a control and power supply circuit for a magnetron device that includes a program controller of the character described, and circuits that are governed by the program controller to insure heating at a given fixed rate of the cathode of the magnetron device incident to initiation of operation thereof and prior to the application of plate voltage thereto and to insure heating at a different and proper rate of the cathode of the magnetron device subsequent to the application of plate voltage thereto.

A further object of the invention is to provide in combination, a power supply system including a voltage doubler and rectifier circuit, a magnetron device that is supplied with d.c. power from the circuit, and structure defining a heating cavity that is supplied with R.F. power from the magnetron device.

Further features of the invention pertain to the particular arrangement of the elements of the control and power supply circuit for the magnetron device and of the elements of the magnetron unit, whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 5 is a further enlarged vertical sectional view, taken through the envelope of the magnetron device incorporated in the magnetron unit;

FIG. 6 is a still further enlarged vertical sectional view, taken through the central portion of the magnetron device;

Figure 1:
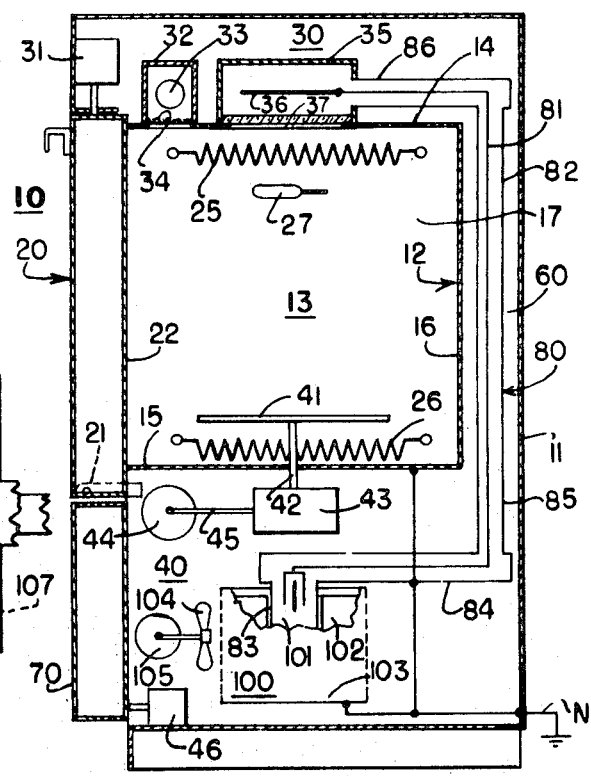
FIG. 1 is a diagrammatic vertical sectional view of electronic heating apparatus incorporating a magnetron unit, as well as a control and power supply circuit therefor, embodying the present invention.
Figure 8:
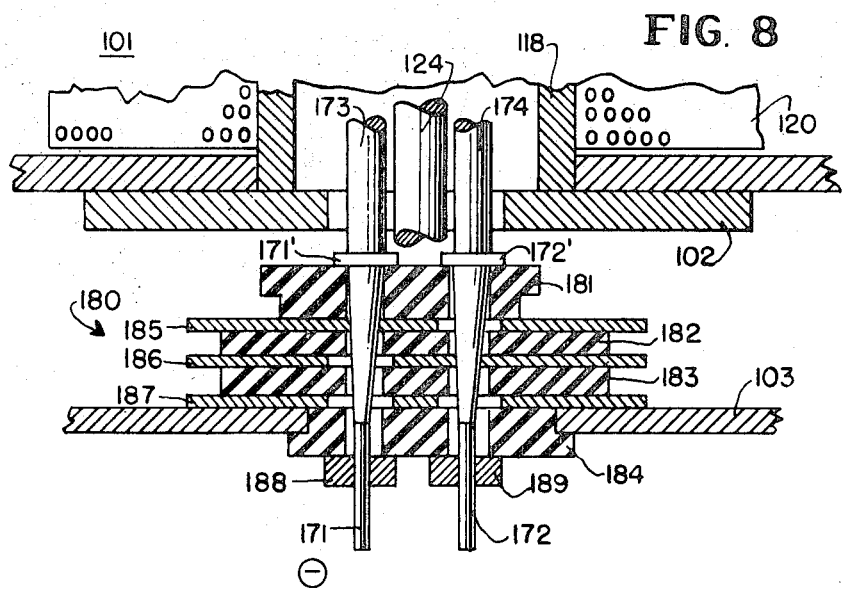
Figure 9:
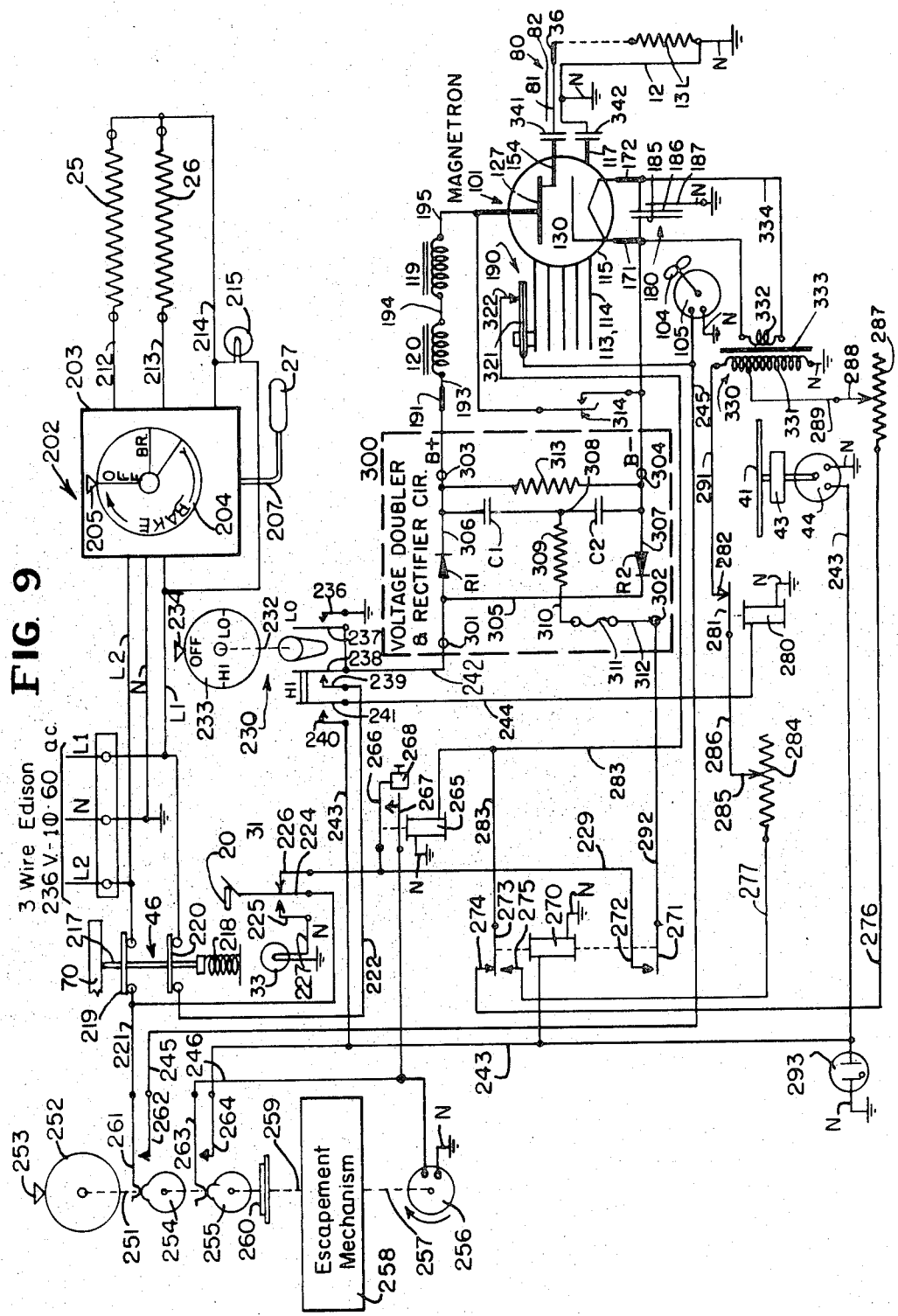

FIG. 8 is a still further enlarged vertical sectional view, taken through the lower portion of the magnetron device, illustrating the second harmonic shunting arrangement that is provided in the cathode terminal and the cathode heater terminal structures incorporated in the magnetron device; and FIG. 9 is a diagrammatic illustration of the control and power supply system that is incorporated in the electronic heating apparatus of FIG. 1.

Referring now to FIG. 1 of the drawings, the electronic heating apparatus 10 there illustrated, and embodying the features of the prevent invention, is in the form of a combination electric and electronic range that is especially designed for home use. More particularly, the range 10 comprises an upstanding substantially box-like casing 11 formed of steel and housing in the upper central portion thereof a metal liner 12 defining a heating cavity 13 therein. Also the metal liner 12 may be formed of steel, and essentially comprises a box-like structure provided with a top wall 14, a bottom wall 15, a rear wall 16, and a pair of opposed side walls 17; whereby the liner 12 is provided with an upstanding front opening into the heating cavity 13 defined therein. Further, the casing 11 is provided with a front door 20 arranged in a front opening formed therein and cooperating with the front opening provided in the liner 12. More particularly, the front door 20 is mounted adjacent to the lower end thereof upon associated hinge structure 21; whereby the front door 20 is movable between a substantially vertical closed position and a substantially horizontal open position with respect to the front opening provided in the liner 12. Also the front door 20 includes an inner metal sheet 22 that may be formed of steel and that cooperates with the liner 12 completely to close the heating cavity 13 when the front door 20 occupies its closed position.

An electric heating unit 25 is arranged in the upper portion of the heating cavity 13 adjacent to and below the top wall 14, and an electric heating unit 26 is arranged in the lower portion of the heating cavity 13 adjacent to and above the bottom wall 15; which electric heating units 25 and 26 are utilized in the carrying out of conventional baking and broiling cooking operations in the heating cavity 13, as explained more fully hereinafter. Also a temperature sensing bulb 27 is arranged in a pocket provided in one of the side walls 17; which temperature sensing bulb 27 forms a part of an oven switch and temperature controller and is utilized in carrying out the previously mentioned conventional baking and broiling operations in the heating cavity 13, as explained more fully subsequently.

An upper machinery compartment 30 is defined between the top wall 14 of the liner 12 and the top wall of the casing 11 and a lower machinery compartment 40 is defined between the bottom wall 15 of the liner 12 and the bottom wall of the casing 11 due to the location of the liner 12 in the upper central portion of the casing 11. Also the rear wall 16 of the liner 12 is spaced forwardly from the rear wall of the casing 11 so as to provide a rear machinery compartment 60 therebetween; which rear machinery compartment 60 communicates at the upper portion thereof with the rear portion of the upper machinery compartment 30 and communicates at the lower portion thereof with the rear portion of the lower machinery compartment 40. Further, the lower front of the casing 11 is provided with a front opening into the lower machinery compartment 40; which front opening is selectively closed by an associated removable lower front panel 70 disposed immediately below the front door 20 and normally closing the open front of the lower machinery compartment 40; which lower front panel 70 is also preferably formed of steel. A door switch 31 is arranged in the upper machinery compartment 30 and is selectively operated in accordance with the position of the front door 20, as explained more fully hereinafter. Also a lamp box 32 formed of sheet steel is arranged in the upper machinery compartment 30; which lamp box 32 is provided with a bottom opening communicating with a cooperating opening formed in the front portion of the top wall 14. The lamp box 32 houses an electric oven lamp 33; and the bottom opening into the lamp box 32 is provided with a reticulated metal screen 34 disposed in covering relation therewith. The reticulated metal screen 34 may be formed of steel wire and is suitably electrically connected to the top wall 14; which reticulated screen 34 is so constructed and arranged that it accommodates illumination of the heating cavity 13 by the electric lamp 33, while preventing the passage of microwave energy into the lamp box 32. Further a distributing box 35 formed of sheet steel is arranged in the upper machinery compartment 30; which distributing box 35 is provided with a bottom opening communicating with a cooperating opening formed in the central portion of the top wall 14. The distributing box 35 houses an antenna 36 electrically insulated therefrom; and the bottom opening into the distributing box 35 is provided with a glass pane 37 disposed in covering and closing relation therewith. The glass pane 37 is so constructed and arranged that it accommodates the ready passage therethrough of microwave energy from the distributing box 35 into the heating cavity 13 that is radiated from the antenna 36 into the distributing box 35, while preventing the passage of oven gases from the heating cavity 13 into the distributing box 35.

Further, a turntable 41 formed of expanded sheet metal is arranged in the lower portion of the heating cavity 13; which turntable 41 is mounted for rotation upon a cooperating upstanding shaft 42 extending through a cooperating hole provided in the bottom wall 15; and which turntable 41 is adapted to support food to be heated or cooked in the electronic heating operation that is carried out in the heating cavity 13, as explained more fully hereinafter. The lower end of the shaft 42 extends into the lower machinery compartment 40 and is connected to a cooperating reduction gear train 43 also disposed in the lower machinery compartment 40. Further, an electric motor 44 is arranged in the lower machinery compartment 40 and is provided with a drive shaft 45 that is operatively connected to the gear train 43. The gear train 43 is so constructed and arranged that normal operation of the electric motor 44 brings about rotation of the turntable 41 at a speed of approximately 6 r.p.m. Further, an interlock switch 46 is arranged in the lower front portion of the lower machinery compartment 40 and disposed in cooperating relation with respect to the removable lower front panel 70; whereby the interlock switch 46 is selectively operated by the placement and by the removal of the lower front panel 70 in a manner more fully explained subsequently.

Further, there is arranged in the central portion of the lower machinery compartment 40, a magnetron unit 100 that comprises a magnetron device 101, an inner metal box-like construction 102 enclosing the magnetron device 101, and an outer metal box-like construction 103 enclosing the inner box-like construction 102. In the arrangement, the two box-like constructions 102 and 103 are provided with open front and rear ends; and further, the magnetron unit 100 comprises a fan 104 that is arranged adjacent to the front end thereof, the fan 104 being directly driven by an associated electric motor 105. Accordingly, operation of the electric motor 105 effects operation of the fan 104 and the consequent direction thereby of a stream of cooling air through the open-ended box-like constructions 102 and 103, as explained more fully hereinafter, and the consequent cooling of the magnetron device 101.

Further, the range 10 comprises a coaxial transmission line 80, including an inner conductor 81 and an outer conductor 82, and operatively connecting the magnetron unit 100 to the antenna 36 and to the distributing box 35, so as to supply the microwave energy from the magnetron device 101 to the antenna 36 and thence into the heating cavity 13. Preferably, the transmission line 80 is of the general construction and arrangement of that disclosed in the copending application of Louis H. Fitzmayer, Ser. No. 135,582, filed Sept. 1, 1961, now U.S. Pat. No. 5,172,987 granted on Mar. 9, 1965 whereby the transmission line 80 comprises the four serially connected sections 83, 84, 85 and 86, the sections 83 and 85 having a substantially circular cross section and the sections 84 and 86 having a substantially rectangular cross section. In the arrangement, the sections 83 and 84 are disposed in the lower machinery compartment 40, the section 86 is disposed in the upper machinery compartment 30 and the section 85 is disposed in the rear machinery compartment 60. The lower end of the inner conductor 81 of the transmission line 80 is capacitively coupled to one of the output terminals of the magnetron device 101, as explained more fully hereinafter, while the upper end of the inner conductor 81 is directly connected to the antenna 36. Similarly, the lower end of the outer conductor 82 of the transmission line 80 is capacitively coupled to the other output terminal of the magnetron device 101, as explained more fully hereinafter, while the upper end of the outer conductor 82 is directly connected to the distributing box 35. Also, it is noted that in the magnetron unit 100, the inner box-like construction 102 and the outer box-like construction 103 are electrically insulated from each other, the inner box-like construction 102 being electrically connected to the output terminal of the magnetron device 101 that is capacitively coupled to the inner conductor 81 of the transmission line 80, and the outer box-like construction 103 being connected to ground potential by the associated neutral conductor N in the power supply system, as explained more fully hereinafter. Further, it is noted that the outer conductor 82 of the transmission line 80, the liner 12 and the casing 11 are connected to ground potential via the associated neutral conductor N.

Figure 2:
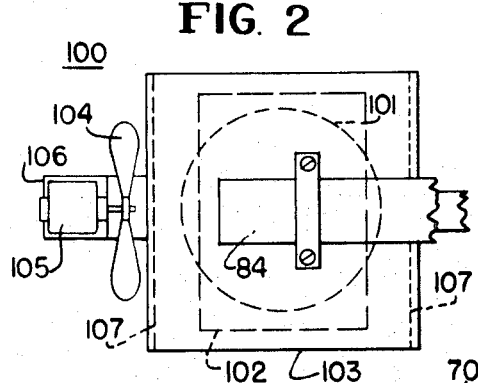
FIG. 2 is an enlarged plan view of the magnetron unit incorporated in the electronic heating apparatus of FIG. 1.
Figure 3:
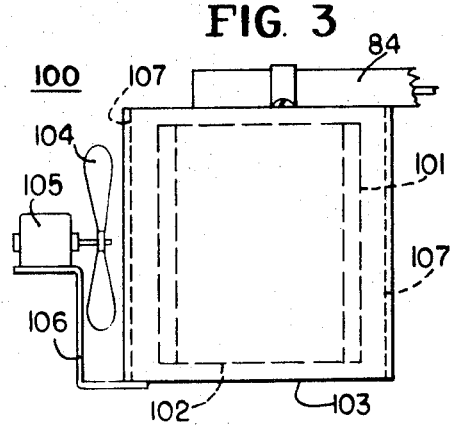
FIG. 3 is a side elevational view of the magnetron unit.
Figure 4:
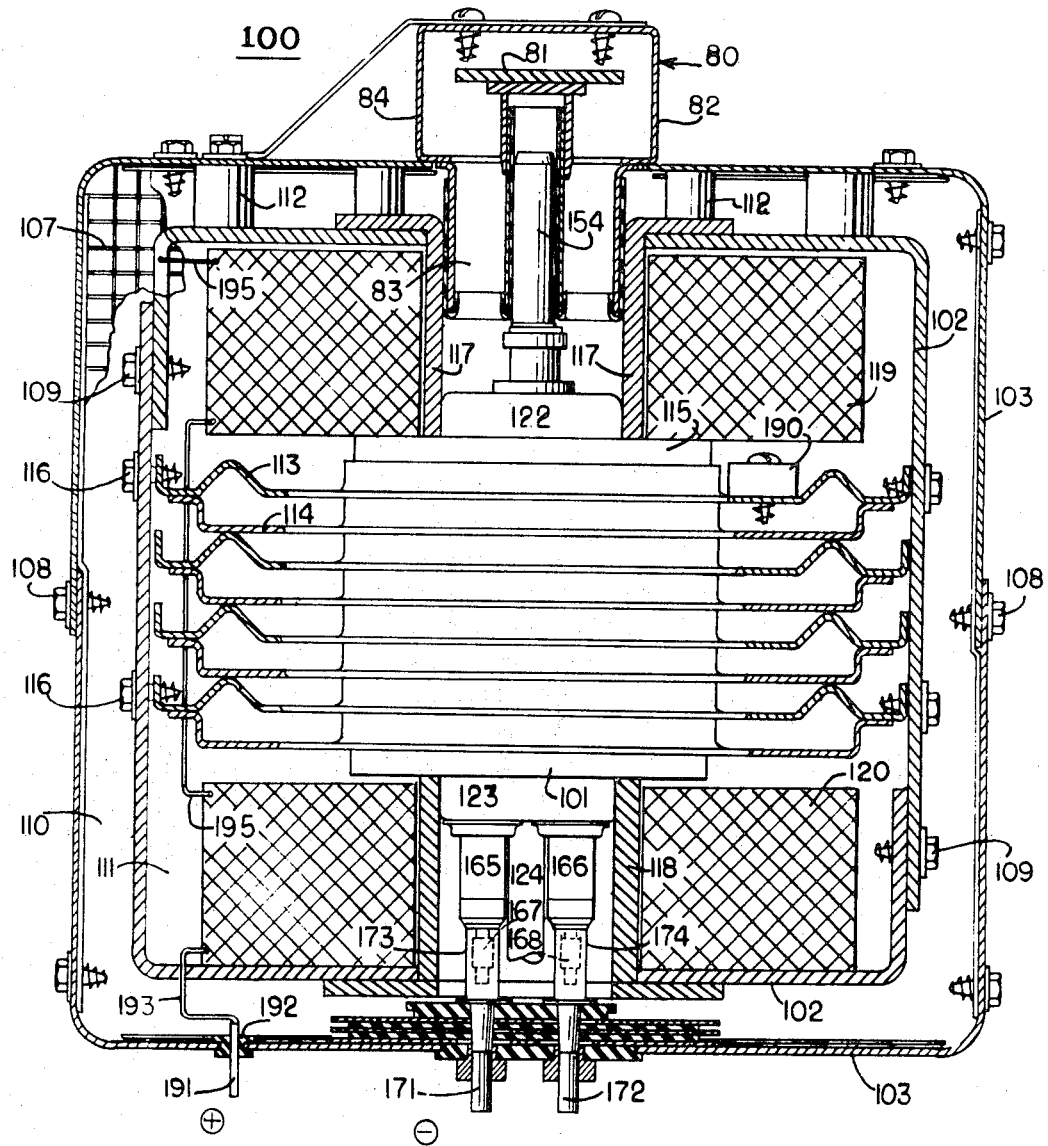
FIG. 4 is a further enlarged vertical sectional view of the magnetron unit.

Further considering the construction and arrangement of the magnetron unit 100 and referring to FIGS. 2, 3 and 4, it is noted that the outer box-like construction 103 carries in the opposite ends thereof a pair of foraminous metal members 107 that may be formed of steel wire, whereby the members 107 accommodate the ready passage of the stream of air from the fan 104 through the unit 100, while preventing radiation of microwave energy from the magnetron device 101 and from the inner box-like construction 102; whereby the outer box-like construction 103 enclosing the inner box-like construction 102 and the magnetron device 101 constitutes a shield for these elements. Also the front portion of the outer box-like construction 103 carries a bracket 106 that directly supports the electric drive motor 105 and consequently the fan 104 in proper position adjacent to the front end of the outer box-like construction 103.

Referring now more particularly to FIG. 4, it is noted that the outer box-like construction 103 has a generally rectangular lateral cross section and is formed of a plurality of sheet steel sections suitably secured together by a plurality of metal screws 108; and similarly, the inner box-like construction 102 has a generally rectangular lateral cross section and is formed of a plurality of soft iron sections suitably secured together by a plurality of metal screws 109. In the arrangement, the box-like construction 102 is spaced inwardly with respect to the outer box-like construction 103 in order to define a first cooling duct 110 therebetween; and the magnetron device 101 is spaced generally inwardly with respect to the inner box-like construction 102 in order to define a second cooling duct 111 therebetween. In the arrangement, the inner box-like construction 102 is directly supported within the outer box-like construction 103, and is electrically insulated therefrom, by a plurality of insulators 112 disposed therebetween; while the magnetron device 101 is disposed in an upstanding position within the inner box-like construction 102 and is supported thereby and electrically connected thereto by a plurality of metal fins 113 and a plurality of metal fins 114 arranged in stacked relation. More particularly, the magnetron device 101 comprises an upstanding substantially cylindrical metal envelope 115, which is described more fully hereinafter, to which the inner portions of the metal fins 113 and 114 are directly connected in good heat-exchange relationship; and the outer portions of the uppermost metal fin 113 and the lowermost metal fin 113 are directly connected to the inner box-like construction 102 by a series of metal screws 116. Accordingly, the metal fins 113 and 114 are arranged alternately in the previously mentioned stack that is disposed in the vertical direction between the envelope 115 and the sides of the inner box-like construction 102; which fins 113 and 114 are disposed principally in spaced-apart relation with respect to each other; and which fins 113 and 114 provide a good heat conducting path between the envelope 115 and the inner box-like construction 102, for the purpose of conducting heat away from the magnetron device 101 that is produced therein incident to normal operation thereof.

Accordingly, it will be understood that the operation of the fan 104 causes a first stream of air to be directed through the first duct 110 and a second stream of air to be directed through the second duct 111. The first stream of air mentioned contacts the interior surface of the outer box-like construction 103 and the exterior surface of the inner box-like construction 102; while the second stream of air mentioned contacts the interior surface of the inner box-like construction 102 and the exterior surface of the envelope 115 of the magnetron device 101, as well as the stack of fins 113 and 114. Thus the two streams of air mentioned are effective to remove the heat from the magnetron device 101 that is generated incident to normal operation thereof.

A thermostatic control switch 190 is carried by the uppermost fin 113 in good heat-exchange relation therewith, as best shown in FIG. 4; which thermostatic switch 190 is operative in the event of an abnormally high operating temperature of the magnetron device 101 and for a purpose more fully explained hereinafter.

The magnetron device 101 also comprises an upper substantially cylindrical pole piece 117 formed of soft iron and disposed above the upper end of the envelope 115 and a lower substantially cylindrical pole piece 118 formed of soft iron and disposed below the lower end of the envelope 115; which pole pieces 117 and 118 respectively carry in surrounding relation therewith, upper and lower electromagnetic coils 119 and 120; whereby the upper coil 119 is disposed between the upper end of the envelope 115 and the lower portion of the inner box-like construction 102; and whereby the lower coil 120 is disposed between the lower end of the envelope 115 and the lower portion of the inner box-like construction 102. The upper and lower pole pieces 117 and 118 are arranged in axial alignment with each other; the upper end of the upper pole piece 117 joins the upper portion of the inner box-like construction 102, and the lower end of the lower pole piece 118 joins the lower portion of the inner box-like construction 102; whereby energization of the coils 119 and 120 is productive of a magnetic field extending between the upper and lower pole pieces 117 and 118 and axially through the envelope 115; which magnetic circuit includes the side portions of the inner box-like construction 102 in the magnetic field return paths thereof.

Referring now to FIGS. 5 and 6, the magnetron device 101 constitutes a crossed-field electric discharge device that is preferably of the construction and arrangement of that disclosed in the previously mentioned copending application of James E. Staats; whereby the metal envelope 115 thereof comprises an upstanding substantially cylindrical side wall 121 formed of copper, an upper end cap 122 formed of steel and a lower end cap 123 formed of steel. The end caps 122 and 123 are arranged in the respective upper and lower ends of the side wall 121 and are hermetically sealed thereto so as to provide the previously mentioned hermetically sealed envelope 115, the envelope 115 being evacuated during the course of manufacture thereof through an associated exhaust tube 124 sealed in the lower end cap 123; which exhaust tube 124 is ultimately pinched off and sealed following the evacuation to a high degree of the interior of the envelope 115. An upper pole plate 125 formed of soft iron is arranged within the upper end of the envelope 115 immediately below the upper end cap 122 and disposed in good magnetic circuit relationship with the upper pole piece 117; and likewise, a lower pole plate 126 formed of soft iron is arranged within the lower end of the envelope 115 immediately above the lower end cap 123 and disposed in good magnetic circuit relationship with the lower pole piece 118; whereby the two pole plates 125 and 126 are included in the previously mentioned magnetic circuit of the magnetron device 101 and effect proper distribution of the magnetic flux through the central portion of the envelope 115.

Arranged within the central portion of the envelope 115 is the principal anode structure of the magnetron device 101 that includes a plurality of circumferentially spaced-apart and radially extending segments or vanes 127 formed of copper, the outer ends of the vanes 127 being electrically connected to the side wall 121 and the inner ends of the vanes 127 being disposed in spaced-apart relation with respect to each other and in an annular array so as to define a substantially centrally disposed axially extending space 128 within the envelope 115 and positioned axially between the central portions of the pole plates 125 and 126. Moreover, the plurality of spaced-apart vanes 127 define therebetween a corresponding plurality of circumferentially spaced-apart resonator cavities opening into the central space 128. In accordance with the disclosure of the previously mentioned Staats application, thirty of the circumferentially spaced-apart vanes 127 may be provided in the central portion of the envelope 115, and a cathode structure 129 is arranged in the axially extending space 128, the cathode structure 129 including a tubular shell 130 disposed radially inwardly and in closely spaced-apart relation with respect to the inner ends of the vanes 127. Also in accordance with the Staats disclosure, the elements of the magnetron device 101 may be so dimensioned and coordinated that the magnetron device 101 is operative to oscillate in the pi mode at an ultra-high frequency of about 915 Mc.

The exterior surface of the tubular cathode shell 130 carries the usual coating, not shown, of electron-emissive material and is of the indirectly heated type; whereby the same is provided with an enclosed filament or electric heater 131 of generally helical form. Further, the cathode structure 129 comprises a substantially rod-like conductor 132 arranged substantially centrally within the cathode shell 130 and connected at the opposite ends thereof to the adjacent ends of the cathode shell 130; whereby the filament 131 is disposed in surrounding relation with respect to the rod-like conductor 132 and spaced radially outwardly therefrom, the filament 131 also being spaced radially inwardly with respect to the cathode shell 130. The upper end of the filament 131 projects to the exterior of the cathode shell 130 and is electrically connected to the extreme upper end of the rod-like conductor 132; and the lower end of the filament 130 projects to the exterior of the cathode shell 131 and is electrically connected to a conducting plate 133. In turn, the conducting plate 133 is electrically connected to a lead conductor 134 that extends to the exterior of the magnetron device 101, as explained more fully below. The lower end of the rod-like conductor 132 terminates in a downwardly extending conductive stud 135 that is electrically connected to a lead conductor 136 that extends to the exterior of the magnetron device 101, as explained more fully below. An upper conductive shield 137 is arranged above the cathode shell 130 and in spaced relation therewith; which upper shield 137 is electrically connected to the extreme upper end of the rod-like conductor 132. Similarly, a lower conductive shield 138 is arranged below the cathode shell 130 and in spaced relation therewith; which lower shield 138 is electrically connected to the extreme lower end of the rod-like conductor 132.

The cathode assembly 129 is supported upon the lower pole plate 126 with the projecting stud 135 extending through a cooperating opening therein; and the mounting arrangement includes a substantially U-shaped bracket 139 disposed below the lower pole plate 126, as well as a nut 140 carried by the extreme lower threaded end of the projecting stud 135. More particularly, the projecting stud 136 extends through a central opening provided in the lower shield 138 and thence through an opening provided in the conducting plate 133 and ultimately through an opening provided in the bracket 139. The upper shield 138 is arranged above the pole plate 126 and is electrically insulated therefrom by an associated insulator 141, while the conducting plate 133 is arranged below the pole plate 126 and is electrically insulated therefrom by an associated insulator 142. A shoulder 143 provided at the junction between the lower end of the rod-like conductor 132 and the upper end of the projecting stud 135 engages the top of the lower shield 138, thereby establishing an electrical connection between the rod-like conductor 132 and the lower shield 138. Further, the lower end of the projecting stud 135 is electrically insulated from the associated bracket 139 by a surrounding insulator 144. Accordingly, the cathode structure 129 is clamped in place between the lower shield 138 and the bracket 139 and upon the lower pole plate 126 by virtue of the action between the nut 140 and the extreme lower threaded end of the projecting stud 135; whereby the cathode structure 129 is retained in proper central location in the axially extending space 128 and in proper closely spaced-part relation with respect to the inner ends of the vanes 127.

Reverting to the anode construction provided in the magnetron device 101 and continuing the reference to FIG. 6, it is pointed out that the upper inner portions of odd ones of the anode vanes 127 are electrically connected together by an associated inner conductive shunting ring 145; while the upper inner portions of even ones of the anode vanes 127 are electrically connected together by an associated outer conductive shunting ring 146. Similarly, the lower inner portions of the odd ones of the anode vanes 127 are electrically connected together by an associated outer conductive shunting ring 147; while the lower inner portions of the even ones of the anode vanes 127 are electrically connected together by an associated inner conductive shunting ring 148. A substantially disk-like conductive plate 149 is arranged above the upper pole plate 125 and is electrically connected adjacent to five circumferentially spaced-apart points near the periphery thereof by five conductive rods 150 to five circumferentially spaced-apart points disposed about the shunting ring 145, the five rods 150 extending through five circumferentially spaced-part openings 151 formed in the upper pole piece 125 so that the shunting ring 145, the five rods 150 and the plate 149 are electrically insulated from the upper pole plate 125. A conductor 151 is electrically connected to the central portion of the plate 149 and projects upwardly through a cooperating opening 152 provided in the central portion of the upper end cap 122 and thence to the exterior of the magnetron device 101 through an associated seal 153, the extreme upper end of the conductor 151 terminating in an output terminal 154 that is accessible from the exterior of the magnetron device 101. Specifically, the seal 153 comprises a lower metallic ring 155 hermetically sealed to the upper end cap 122, an upper metallic ring 156 hermetically sealed to the lower portion of the output terminal 154 and an intervening insulator 157 hermetically sealed to the upper portion of the metallic ring 155 and to the lower portion of the metallic ring 156.

Since the R.F. output voltage of the magnetron device 101 is developed between the inner and outer ends of the vanes 127, it will be appreciated that the envelope 115 constitutes the other output terminal thereof; whereby the pole piece 117 electrically connected to the envelope 115, in fact, comprises the other output terminal of the magnetron device 101. Thus in the arrangement, the elements 154 and 117 comprise the output terminals of the magnetron device 101, whereby the inner output terminal 154 is surrounded by the outer output terminal 117 and electrically insulated therefrom; which output terminals 154 and 117 are readily accessible from the exterior of the magnetron device 101, as explained more fully hereinafter.

Further, the magnetron device 101 comprises a balance capacitor in the form of a conductive ring 160 disposed below the lower inner shunting ring 148 and surrounding the lower shield 138 and mounted upon and electrically connected to the lower pole plate 126. Accordingly, the conductive ring 160 is disposed adjacent to and electrically insulated from the lower inner shunting ring 148 that is connected to the lower inner portions of the even ones of the anode vanes 127; and it will be recalled that the upper inner shunting ring 145 is connected to the upper inner portions of the odd ones of the anode vanes 127. Hence a balance capacitor is thus provided by the two rings 160 and 148 to provide a capacitance on the lower side of the resonator structure generally equal to the capacitance in the output circuit connected to the upper side of the resonator structure; whereby the balance capacitor compensates for any unbalance introduced by the output circuit. Specifically, the balance capacitor defined by the rings 160 and 148 provides a lumped capacitance which is effective at the pi mode frequency of oscillation of the magnetron device 101 to compensate for the unbalance introduced by the output circuit. At all other frequencies, i.e., other than the pi mode frequency, the output circuit continues unbalanced, with the result that the field patterns for these undesired modes are unbalanced. Such unbalance has the beneficial effect of causing unfavorable conditions for oscillation in other than the pi mode and thus suppresses radiation from the magnetron device 101 at these other undesired frequencies.

The upper end cap 122 serves as a bypass filter to reduce harmonic radiation from the magnetron device 101; and specifically, the upper end cap 122 is spaced from the resonator terminals approximately one-fourth wave length of the fundamental operating frequency of the magnetron device 101. Accordingly, the upper end cap 122 acts as a R.F. bypass capacitor for the second and higher harmonics of the fundamental operating frequency of the magnetron device 101. Specifically, the upper end cap 122 is of substantial area relative to the elements comprising the portion of the output circuit, including the conductors 150, the conductor plate 149 and the center conductor 151; whereby substantial capacitance is afforded between these elements so that at the second and higher harmonics of the fundamental operating frequency, the structure described acts as a R.F. shunt capacitance with the result that such higher frequency energy is not transmitted to the load circuit.

Figure 7:
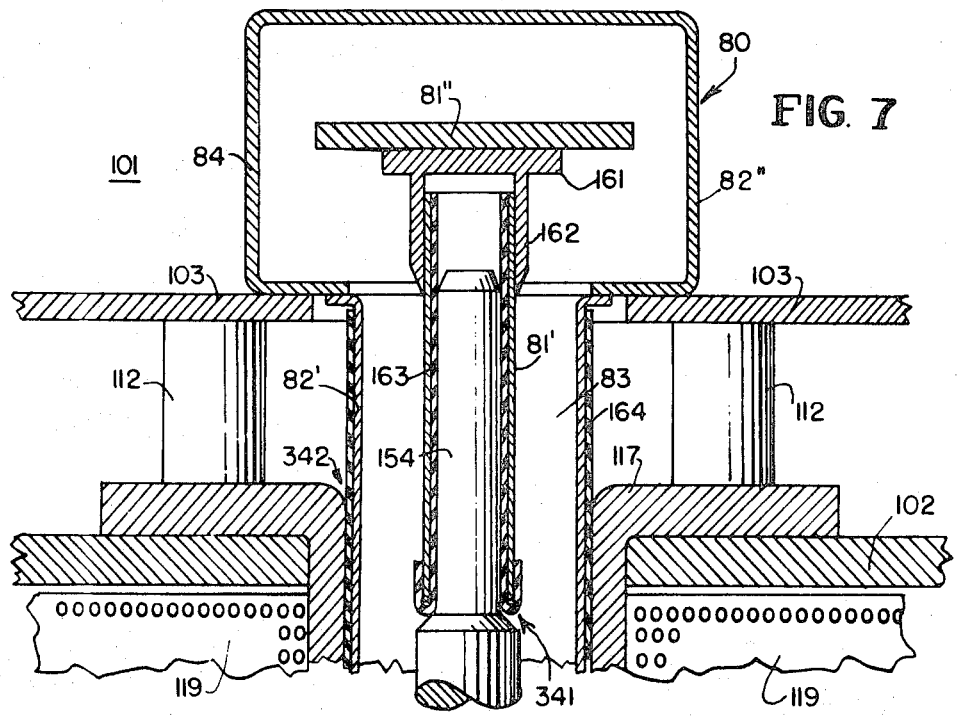
FIG. 7 is a still further enlarged vertical sectional view, taken through the upper portion of the magnetron device, illustrating the capacitive coupling arrangement between the output terminals of the magnetron device and associated coaxial transmission line.

As previously noted, in conjunction with FIG. 1 the lowermost section 83 of the transmission line 80 is capacitively coupled to the output terminals 154, and the manner of accomplishing this result is best illustrated in FIGS. 4 and 7. More particularly, the section 83 of the transmission line 80 is substantially cylindrical and includes the inner conductor 81' of substantially cylindrical configuration and the outer conductor 82' of substantially cylindrical configuration; while the section 84 of the transmission line 80 is substantially rectangular and includes the inner conductor 81" of substantially strap-like configuration and the outer conductor 82" of substantially rectangular configuration. The inner conductor 81" of the section 84 is directly secured and electrically connected to an associated fixture 161 that terminates in a downwardly projecting cylindrical barrel 162 that is, in turn, fitted over and electrically connected to the upper end of the tubular inner conductor 81' of the section 83. The outer conductor 82" of the section 84 is directly secured and electrically connected to the upper end of the outer conductor 82' of the section 83. The inner conductor 81' of the section 83 surrounds the extreme upper end of the output terminal 154 in spaced relation therewith and is electrically insulated therefrom by an associated tubular insulator 163 carried by and disposed interiorly of the inner conductor 81'. Accordingly, the conductive elements 154 and 81', together with the insulator 163, comprise a capacitor that capacitively couples the output terminal 154 of the magnetron device 101 to the inner conductor 81' of the section 83 of the transmission line 80. The outer conductor 82' of the section 83 is surrounded by the extreme upper end of the output terminal 117 in spaced relation therewith and is electrically insulated therefrom by an associated tubular insulator 164 carried by and disposed exteriorly of the outer conductor 82'. Accordingly, the conductive elements 117 and 82', together with the insulator 164, comprise a capacitor that capacitively couples the outer terminal 117 of the magnetron device 101 to the outer conductor 82' of the section 83 of the transmission line 80. Thus, it will be appreciated that while the respective inner and outer conductors 81' and 82' of the section 83 of the transmission line 80 are capacitively coupled to the respective output terminals 154 and 117 of the magnetron device 101, they are electrically insulated therefrom. Hence, the positive anode potential of the d.c. supply source appearing upon the elements 154 and 117 is electrically insulated from the corresponding elements 81' and 82' of the section 83 of the transmission line 80. However, the outer conductor 82" of the section 84 of the transmission line 80 is electrically connected to the outer box-like construction 103 and consequently to ground potential, as previously explained.

Considering now the exterior connections that are made to the cathode shell 130 and to the filament or electric heater 131, reference is made to FIGS. 4, 5 and 6, whereby it is reiterated that the lead conductor 136 is commonly electrically connected to the cathode shell 130 and to the upper extremity of the cathode heater 131, while the lead conductor 134 is electrically connected to the lower extremity of the cathode heater 131. The lead conductor 136 further extends through a cooperating opening provided in the lower end cap 123 and is hermetically sealed in place by an associated seal 165 that may be substantially identical to the seal 153, as previously described in conjunction with FIG. 6; similarly, the lead conductor 134 further extends through a cooperating opening provided in the lower end cap 123 and is hermetically sealed in place by an associated seal 166 that may be substantially identical to the seal 153, as previously described in conjunction with FIG. 6. In turn, the lead conductor 136 is electrically connected to a conductive plug 167 within the seal 165, and the lead conductor 134 is electrically connected to a conductive plug 168 within the seal 165.

Referring now to FIGS. 4 and 8, the lower portion of the outer box-like construction 103 carries a pair of terminals 171 and 172 extending to the exterior through an opening provided therein and electrically insulated therefrom. The terminal 171 constitutes a cathode and cathode heater terminal and the inner end thereof terminates in a socket 173 that frictionally engages and electrically connects to the plug 167. On the other hand, the terminal 172 constitutes only a cathode heater terminal and the inner end thereof terminates in a socket 174 that frictionally engages and electrically connects to the plug 168. More particularly, the two terminals 171 and 172 are secured in place by an assembly 180 in the form of a stack of insulators 181, 182, 183 and 184 and of intervening conductive plates 185, 186 and 187, whereby the assembly 180 constitutes a R.F. capacitive shunt from the terminals 171 and 172 to ground potential of the second and higher harmonics of the fundamental operating frequency of the magnetron device 101.

The construction and arrangement of the assembly 180 will best be understood from FIG. 8, and in passing it is noted that therein the relative thicknesses of the elements 181 to 187, inclusive, are substantially exaggerated for the purpose of illustration. In the arrangement, the terminals 171 and 172 respectively carry two annular shoulders 171' and 172' that are arranged between the bottom portions of the two box-like constructions 102 and 103. The shoulder 171' carried by the terminal 171 engages the adjacent upper surface of the insulator 181, and the outer end of the terminal 171 carries a speed nut 188 disposed in frictional engagement with the lower surface of the insulator 184, thereby to retain together the stacked elements 181 to 187, inclusive. Similarly, the shoulder 172' carried by the terminal 172 engages the adjacent upper surface of the insulator 181, and the outer end of the terminal 172 carries a speed nut 189 disposed in frictional engagement with the lower surface of the insulator 184, thereby to retain together the stacked elements 181 to 187, inclusive. The conductive plate 185 has a small opening therein through which the shank of the terminal 171 extends in frictional contact therewith so that the conductive plate 185 is electrically connected to the terminal 171; and the conductive plate 185 has a large opening therein through which the shank of the terminal 172 extends in spaced relation so that the conductive plate 185 is electrically insulated from the terminal 172. Similarly, the conductive plate 186 has a small opening therein through which the shank of the terminal 172 extends in frictional contact therewith so that the conductive plate 186 is electrically connected to the terminal 172; and the conductive plate 186 has a large opening therein through which the shank of the terminal 171 extends in spaced relation so that the conductive plate 186 is electrically insulated from the terminal 171. Similarly, the conductive plate 187 has two large openings therein through which the shanks of the respective terminals 171 and 172 extend in spaced relation therewith so that the conductive plate 187 is electrically insulated from both of the terminals 171 and 172; however, the lower surface of the conductive plate 187 directly engages the upper surface of the adjacent lower portion of the second box-like construction 103 so as electrically to connect the conductive plate 187 to the second box-like construction 103 and consequently to ground potential. The conductive plates 185, 186 and 187 are mutually electrically insulated from each other by the respectively interposed insulators 182 and 183. Accordingly, the assembly 180 comprises a composite capacitor, including the plate 185 electrically connected to the terminal 171, the plate 186 electrically connected to the terminal 172 and the plate 187 electrically connected to ground potential. In the arrangement, the two conductive plates 185 and 186 are substantially disk-shaped and have a diameter that is substantially equal to one-eighth of the wave length of the fundamental operating frequency of the magnetron device 101, whereby the second and higher harmonics of the fundamental operating frequency of the magnetron device 101 are bypassed to ground potential from the terminals 171 and 172 and consequently from the input circuit of the magnetron device 101.

Finally, the magnetron device 101 comprises, as best shown in FIG. 4, a conductive terminal 191 that is carried by an insulator 192 arranged in an opening provided in the lower portion of the outer box-like construction 103; which terminal 191 constitutes the anode terminal for the magnetron device 101. The inner end of the terminal 191 is electrically connected by a conductor 193 to one terminal of the lower coil 120; the upper terminal of the lower coil 120 is electrically connected by a conductor 194 to one terminal of the upper coil 119; and the other terminal of the upper coil 119 is electrically connected by a conductor 195 to the inner box-like construction 102 and consequently to the envelope 115 and thus to the anode vanes 127 of the magnetron device 101.

Referring now to FIG. 9, the control and power supply system for the range 10 comprises the previously described heating units 25 and 26, the magnetron device 101, the oven lamp 33, the door switch 31, the interlock switch 46, the turntable operating motor 44, the fan operating motor 105 and the magnetron thermostatic switch 190, as well as the transmission line 80 extending to the antenna 36 arranged in the distributing box 35 operatively associated with the heating cavity 13 of the range 10. Also, the system comprises a 3-wire Edison network of 236 volts, single-phase, 60-cycles, a.c., and including two ungrounded line conductors L1 and L2 and a grounded neutral conductor N, the three conductors mentioned being terminated by an associated electrical insulating block 201. The interlock switch 46 includes an electrical insulating operating stem 217 that carries a pair of contact bridging members 219 and 220, the operating stem 217 being biased by an associated coil spring 218 to actuate the contact bridging members 219 and 220 into their open positions when the lower front panel 70 is removed from the associated lower front of the cabinet 11 of the range 10. On the other hand, when the lower front panel 70 is in place, the operating stem 217 is moved by the lower front panel 70 against the bias of the coil spring 218 to actuate the contact bridging members 219 and 220 into their closed positions. The door switch 31 comprises a movable switch spring 224 and a pair of cooperating stationary switch springs 225 and 226. When the front door 20 occupies its closed position, the movable switch spring 224 is actuated to engage the stationary switch spring 226 and to disengage the stationary switch spring 225; on the other hand, when the front door 20 occupies its open position, the movable switch spring 224 is actuated to engage the terminals terminals two terminals stationary switch spring 225 and to disengage the stationary switch spring 226.

Further, the system comprises an oven switch and temperature controller 202 of conventional construction and arrangement and including a casing 203 carrying a manually operable dial 204 cooperating with an associated index marker 205. The dial 204 comprises an "off" position, a variable "bake" position corresponding to an operating temperature range, and a "broil" position. The casing 203 houses a power switch, not shown, that is selectively operated by the dial 204 into corresponding "off," "bake" and "broil" positions. Also, the casing 203 houses a temperature control switch, not shown, that is selectively set by the dial 204 and that is selectively operated by the temperature sensing bulb 27 through an associated capillary tube 207. Further, the controller 202 comprises three input terminals to which the line conductors L1 and L2 and the neutral conductor N are respectively connected, as well as three output terminals to which three conductors 212, 213 and 214 are respectively connected. The two terminals of the upper heating unit 25 are respectively connected to the conductors 212 and 214, and the two terminals of the lower heating unit 26 are respectively connected to the conductors 213 and 214.

Further, the system comprises a power selector switch 230 that includes a rotatably mounted operating shaft 232 carrying at the outer end thereof a manually operable dial 233 that cooperates with an associated index marker 234. The power selector switch 230 has an "off" position, a "high" position and a "low" position; and the inner end of the operating shaft 232 carries an electrical insulator 235 that cooperates with a set of high switch springs 238, 239, 240 and 241 and with a set of low switch springs 236 and 237. In the arrangement, when the power selector switch 230 occupies its "off" position, the switch spring 238 disengages the switch spring 239, the switch spring 240 disengages the switch spring 241, and the switch spring 237 disengages the switch spring 236. When the power selector switch 230 occupies its "high" position, the switch spring 238 is actuated to engage the switch spring 239 and the switch spring 240 is actuated to engage the switch spring 241. When the power selector switch 230 occupies its "low" position, the switch spring 237 is actuated to engage the switch spring 236.

Further, the system comprises a program controller 250 that includes an operating shaft 251 carrying a manually operable dial 252 on the outer end thereof that cooperates with an associated index marker 253, the manual dial 252 being calibrated in terms of minutes of cooking time of operation of the magnetron device 101, as explained more fully hereinafter. Also, the operating shaft 252 carries two insulating cams 254 and 255 that respectively cooperate with two movable switch springs 261 and 263; which switch springs 261 and 263 respectively cooperate with two stationary switch springs 262 and 264. Also the program controller 250 comprises an electric timer motor 256 that is preferably of the "Telechron" type and that is provided with an operating shaft 257 that is connected to a conventional escapement mechanism 258. In turn, the escapement mechanism 258 is provided with an operating shaft 259; and the adjacent ends of the operating shafts 251 and 259 are operatively connected by an associated friction clutch 260.

Considering now the general mode of operation of the program controller 250, when the manual dial 252 occupies its "0" time position, the two insulating cams 254 and 255 respectively actuate the two movable switch springs 261 and 263 so as to disengage the respective stationary switch springs 262 and 264. On the other hand, when the manual dial 252 is selectively and variably operated out of its "0" time position by rotation in the clockwise direction, the two insulating cams 254 and 255 respectively actuate the two movable switch springs 261 and 263 to engage the respective stationary switch springs 262 and 264. Closure of the set of switch springs 363, 264 effects energization of the timer motor 256, whereby the operating shaft 257 is rotated upon a timed basis in the counterclockwise direction so as to cause at spaced time intervals the escapement mechanism 258 to actuate its operating shaft 259 in corresponding small angular steps in the counterclockwise direction. The small angular steps of the operating shaft 259 are transmitted through the clutch 260 to the operating shaft 251, thereby to effect small angular steps of rotation of the operating shaft 251 in the counterclockwise direction, whereby the manual dial 252 is reset in small angular steps on a timed basis back toward its "0" time position. Subsequently, when the manual dial 252 is returned back into its "0" time position, the insulating cams 254 and 255 return the two sets of switch springs 261, 262 and 263, 264 back into their respective open positions, whereby further operation of the time motor 256 is arrested.

The arrangement of the slip clutch 260 between the adjacent ends of the operating shafts 251 and 259 accommodates relative rotation of the operating shaft 251 under the control of the manual dial 252 and independently of the operating shaft 259 of the escapement mechanism 258; however, the counterclockwise stepped rotation of the operating shaft 259 of the escapement mechanism 258 is transmitted through the slip clutch 260 to the operating shaft 251 so as to reset the manual dial 252 back into its "0" time position, as described above.

The magnetron thermostatic switch 190 may be of any conventional type, but as illustrated the same essentially comprises a thermostatic element 321 and an associated switch spring 322, the elements 321 and 322 being electrically insulated from each other and from the fins 113, 114 of the magnetron device 101. However, the thermostatic element 321 is responsive to the temperature of the fins 113, 114 as previously explained; whereby the thermostatic element 321 is selectively movable with respect to the switch spring 322. More particularly, when the temperature of the magnetron device 101 is within the normal temperature range of operation thereof, the thermostatic element 321 engages the switch spring 322, so as to close the switch 190. On the other hand, in the event of an abnormally high temperature of the magnetron device 101, the thermostatic element 321 is actuated to disengage the switch spring 322, so as to open the switch 190.

Further, the system comprises a converter in the form of a voltage doubler and rectifier circuit 300 that includes a pair of input terminals 301 and 302 and a pair of output terminals 303 and 304, as well as a pair of capacitors C1 and C2 that are preferably of the electrolytic type and a pair of diodes R1 and R2 that are preferably of the silicon-crystal type. Further, the circuit 300 comprises a bleeder or stabilizing resistor 313, a surge limiting resistor 309 and a current protective device in the form of a fuse 311.

In the arrangement of the voltage doubler and rectifier circuit 300, one terminal of the capacitor C1 is connected by a conductor 306 to the output terminal 303; the other terminal of the capacitor C1 is connected by a conductor 308 to one terminal of the capacitor C2; and the other terminal of the capacitor C2 is connected by a conductor 307 to the output terminal 304. The input terminal 301 is connected by a conductor 305 to the positive pole of the crystal rectifier R1 and to the negative pole of the crystal rectifier R2; the negative pole of the crystal rectifier R1 is connected to the conductor 306; and the positive pole of the crystal rectifier R2 is connected to the conductor 307. The input terminal 302 is connected by a conductor 312 to one terminal of the fuse 311; the other terminal of the fuse 311 is connected by a conductor 310 to one terminal of the surge limiting resistor 309; and the other terminal of the surge limiting resistor 309 is connected to the conductor 308. Finally, the terminals of the stabilizing resistor 313 are respectively connected to the conductors 306 and 307.

Further, the system comprises a time delay relay 265, a power relay 270 and a cathode heater relay 280. The time delay relay 265 is of the slow-to-operate type and controls two switch springs 266 and 267, and further comprises a dash pot, or other device, 268 that is operatively connected to the switch spring 266. When the time delay relay 265 occupies its restored position, the switch spring 266 disengages the switch spring 267. When the winding of the time delay relay 265 is energized, the same begins to operate; however, it is not operated into its fully operated position until after a time delay of about 45 seconds, due to the provision of the dash pot 268 in cooperating relation with the switch spring 266, whereby at the expiration of the time interval mentioned and upon full operation of the time delay relay 265, the switch spring 266 engages the switch spring 267. When the winding of the time delay relay 265 is deenergized, the same is immediately restored, so that the switch spring 266 immediately disengages the switch spring 267. The power relay 270 controls a set of switch springs 271 to 275, inclusive. When the power relay 270 occupies its restored position, the switch spring 271 disengages the switch spring 272, the switch spring 273 engages the switch spring 274, and the switch spring 273 disengages the switch spring 275. When the power relay 270 occupies its operated position, the switch spring 271 engages the switch spring 272, the switch spring 273 disengages the switch spring 274, and the switch spring 273 engages the switch spring 275. The cathode heater relay 280 controls a set of switch springs 281 and 282. When the cathode heater relay 280 occupies its restored position, the switch spring 281 engages the switch spring 282. When the cathode heater relay 280 occupies its operated position, the switch spring 281 disengages the switch spring 282.

Further, the system comprises a cathode heater transformer 330 that is provided with a primary winding 331, a secondary winding 332, and an associated iron core 333. Further, the system comprises an oven pilot lamp 215, an ultra-high frequency pilot lamp 293, a shorting switch 314, and two adjustable resistors 284 and 287 that are respectively provided with two cooperating adjustable contacts 285 and 288. Finally, it is noted that the impedance of the heating cavity 13 is represented as comprising the load resistor 13L which is, in effect, connected between the antenna 36 and the liner 12 that is, in fact, connected to the neutral conductor N.

Considering now the connection of the system, it is noted that the two contacts of the interlock switch 46 that are controlled by the contact bridging member 219 are respectively connected to the line conductor L2 and to a conductor 221; and the two contacts of the interlock switch 46 that are controlled by the contact bridging member 220 are respectively connected to the line conductor L1 and to a conductor 222. In the door switch 31, the switch springs 224, 225 and 226 are respectively connected to the conductor 221, to a conductor 227 and to a conductor 229. In the power selector switch 230, the switch springs 236, 237, 238, 239, 240 and 241 are respectively connected to the neutral conductor N, to a conductor 242, to the conductor 242, to the conductor 222, to a conductor 243, and to a conductor 244. The oven lamp 33 is bridged across the neutral conductor N and the conductor 227; the oven pilot lamp 215 is bridged across the neutral conductor N and the conductor 214; and the ultra-high frequency pilot lamp 293 is bridged across the neutral conductor N and the conductor 243.

In the program controller 250, the switch springs 261, 262, 263 and 264 are respectively connected to the conductor 221, to a conductor 245, to a conductor 246, and to the conductor 243. The timer motor 256 is bridged across the neutral conductor N and the conductor 246.

In the time delay relay 265, the switch springs 266 and 267 are respectively connected to the conductors 229 and 246, while the winding thereof is bridged across the neutral conductor N and a conductor 283. In the power relay 270, the switch springs 271, 272, 273, 274 and 275 are respectively connected to a conductor 292, to the conductor 229, to the conductor 283, to a conductor 276, and to a conductor 277, while the winding thereof is bridged across the neutral conductor N and the conductor 243. In the cathode heater relay 280, the switch springs 281 and 282 are respectively connected to a conductor 286 and to a conductor 291, while the winding thereof is bridged across the neutral conductor N and the conductor 244.

The terminal of the resistor 284 is connected to the conductor 277 and the adjustable contact 285 of the resistor 284 is connected to the conductor 286. The terminal of the resistor 287 is connected to the conductor 276 and the adjustable contact 288 of the resistor 287 is connected to a conductor 289.

In the magnetron thermostatic switch 190, the thermal element 321 is connected to the conductor 245 and the switch spring 322 is connected to the conductor 283. The turntable operating motor 44 is bridged across the neutral conductor N and the conductor 243; while the fan operating motor 105 is bridged across the neutral conductor N and the conductor 245. The input terminals 301 and 302 of the voltage doubler and rectifier circuit 300 are respectively connected to the conductors 242 and 292, while the output terminals 303 and 304 of the voltage doubler and the rectifier circuit 300 are respectively connected to a B+ conductor and to a B− conductor. The B+ conductor is connected to the positive terminal 191 of the magnetron device 101, while the B− conductor is connected to the cathode heater terminal 171 of the magnetron device 101. The lower extremity of the primary winding 331 of the cathode heater transformer 330 is connected to the neutral conductor N; the upper extremity of the primary winding 331 is connected to the conductor 291; and the midtap of the primary winding 331 is connected to the conductor 289. The secondary winding 332 of the cathode heater transformer 330 is bridged across the B− conductor and a conductor 334; which conductor 334 is connected to the cathode heater terminal 172 of the magnetron device 101. In the magnetron device 101, the R.F. output terminals 154 and 117 are respectively capacitively coupled to the inner conductor 81 and to the outer conductor 82 of the transmission line 80, as previously explained; whereby the capacitor coupling the output terminal 154 to the inner conductor 81 is indicated at 341 and the capacitor coupling the output terminal 117 to the outer conductor 82 is indicated at 342. Finally the two terminals of the shorting switch 314 are respectively connected to the B− conductor and to the conductor 195.

Considering now the carrying out of a conventional electric baking operation in the range 10, the cook places the food to be cooked in the heating cavity 13 and then rotates the manual dial 204 of the oven switch and temperature controller 202 out of its "off" position into its variable "bake" position and corresponding to the temperature that is to be maintained in the heating cavity 13. This operation of the manual dial 204 actuates the power switch, not shown, housed in the casing 203, whereby the line conductors L1 and L2 and the neutral conductor N are respectively connected to the conductors 214, 213 and 212, with the result that the lower heating unit 26 is energized across the 236 volts of the Edison network, and the upper heating unit 25 is energized across the 118 volts of the Edison network. Also, this operation of the manual dial 204 preselects the temperature that is to be maintained in the heating cavity 13. Further, the oven pilot lamp 215 is energized across the line conductor L1 and the neutral conductor N so as to indicate that the oven 10 is operated as an electric oven.

As the baking operation proceeds, the temperature in the heating cavity 13 rises to that preselected by the manual dial 204, whereby the temperature sensing bulb 27 opens the temperature switch (not shown) housed in the casing 203, thereby to interrupt the previously mentioned circuits for energizing the heating units 25 and 26. The temperature in the heating cavity 13 then subsides, whereby the temperature sensing bulb 27 recloses the temperature switch mentioned, thereby to recomplete the previously mentioned circuits for energizing the heating units 25 and 26.

The baking operation continues in the heating cavity 13 until the manual dial 204 is returned back into its "off" position, whereby the power switch mentioned is actuated to disconnect the line conductors L1 and L2 and the neutral conductor N from the conductors 214, 213 and 212, so as to deenergize the heating units 25 and 26 and to extinguish the oven pilot lamp 215.

Considering now the carrying out of a conventional broiling operation in the range 10, the cook places the food to be cooked in the upper portion of the heating cavity 13 immediately below the upper heating unit 25 and then rotates the manual dial 204 of the oven switch and temperature controller 202 out of its "off" position through its variable "babake" position and into its "broil" position. This operation of the manual dial 204 actuates the power switch (not shown) housed in the casing 203, whereby the line conductors L1 and L2 are respectively connected to the conductors 214 and 212, with the result that the upper heating unit 25 is energized across the 236 volts of the Edison network and the lower heating unit 26 is deenergized. Further, the oven pilot lamp 215 is energized across the line conductor L1 and the neutral conductor N, so as to indicate that the oven 10 is operating upon an electric basis.

The broiling operation continues in the heating cavity 13 until the manual dial 204 is returned back into its "off" position, whereby the power switch mentioned is actuated to disconnect the line conductors L1 and L2 from the conductors 214 and 212, so as to deenergize the upper heating unit 25 and to extinguish the oven pilot lamp 215.

Prior to consideration of the carrying out of an electronic cooking operation in the heating cavity 13, it is well to consider the general mode of operation of the voltage doubler and rectifier circuit 300 and it is pointed out that when a low frequency a.c. potential is applied across the input terminals 301 and 302 thereof, a d.c. potential is presented across the output terminals 303 and 304 thereof. More particularly, in the positive loops of the input a.c. voltage, the diode R2 is in a blocking condition, while the diode R1 is in a conducting condition. Accordingly, the capacitor C1 is charged via a circuit extending from the input terminal 301, the conductor 305, the diode R1, the conductor 306, the capacitor C1, the conductor 308, the surge limiting resistor 309, the conductor 310, the fuse 311 and the conductor 312 to the input terminal 302. In the negative loops of the input a.c. voltage, the diode R1 is in a blocking condition, while the diode R2 is in a conducting condition. Accordingly, the capacitor C2 is charged via a circuit extending from the input terminal 302, the conductor 312. the fuse 311, the conductor 310, the surge limiting resistor 309, the conductor 308, the capacitor C2, the conductor 307, the diode R2 and the conductor 305 to the input terminal 301. Specifically, each of the capacitors C1 and C2 is charged to a voltage only somewhat lower then the peak voltage of the input a.c. voltage; and since the two capacitors C1 and C2 are bridged in series relation via the conductors 306, 308 and 307 across the output terminals 303 and 304, the d.c. voltage across the output terminals 303 and 304 is only somewhat lower than double the peak voltage of the input a.c. voltage and somewhat higher than double the R.M.S. voltage of the input a.c. voltage; whereby the circuit 300 is referred to as a "voltage doubler and rectifier circuit".

In this connection, it will be recalled that in an a.c. supply source, the peak voltage is about 141 percent higher than the R.M.S. voltage and that it is the R.M.S. voltage that is normally referred to in the rating of the a.c. supply source. Thus an a.c. supply source having an R.M.S. voltage of 236 volts has a peak voltage of approximately 333 volts.

Also, it is pointed out that the surge limiting resistor 309 prevents instantaneous charging of each of the capacitors C1 anc C2 and thus prevents excessive instantaneous surge currents from being drawn by the circuit 300 from the a.c. input supply source; while the bleeder or stabilizer resistor 313 has an approriate high resistance so as to stabilize the d.c. output voltage from the output terminals 303 and 304 of the circuit 300. The fuse 311 serves the purpose of opening the a.c. input circuit in the event the circuit 300 should draw an excessively high a.c. current due to a short-circuit upon the busses B+ and B— that are connected to the respective output terminals 303 and 304.

Further, when the power selector switch 230 occupies its "high" position, the 236 volts a.c. of the Edison network may be connected across the input terminals 301 and 302, whereby the d.c. voltage present across the output terminals 303 and 304 may be approximately 570 volts (somewhat lower than double the peak voltage of the a.c. input voltage and somewhat higher than double the R.M.S. voltage of the a.c. input voltage). On the other hand, when the power selector switch 230 occupies its "low" position, the 118 volts a.c. of the Edison network may be connected across the input terminals 301 and 302, whereby the d.c. voltage present across the output terminals 303 and 304 may be approximately 290 volts. These d.c. output voltages of 570 and 290 volts are somewhat lower than double the corresponding a.c. input peak voltages of 333 and 166 volts due to voltage drops across the surge limiting resistor 309, the diodes R1 and R2, etc.

When the relatively high d.c. output voltage of 570 volts is supplied from the circuit 300 to the magnetron device 101, it oscillates to supply ultra-high frequency energy at about 915 Mc to the heating cavity 13, the R.F. power output of the magnetron device 101 being approximately 700 watts. On the other hand, when the relatively low d.c. output voltage of 290 volts is supplied from the circuit 300 to the magnetron device 101, it oscillates to supply ultra-high frequency energy at about 915 Mc to the heating cavity 13, the R.F. power output of the magnetron device 101 being approximately 100 watts. Hence, the R.F. power that is supplied by the magnetron device 101 to the heating cavity 13 is preset by the position of the power selector switch 230, as expalined above. Also, it is reiterated that the magnetron device 101 is especially constructed and arranged so that it is characterized by stable and efficient operation with the relatively low d.c. plate voltages of 290 and 570 volts. Specifically, the magnetron device 101 has a continuous R.F. power rating of about 100 watts at the d.c. plate voltage of 290 volts and has a continuous R.F. power rating of about 700 watts at the d.c. plate voltage of 570 volts.

The carrying out of electronic cooking operations in the heating cavity 13 is conditioned upon maintaining the lower front panel 70 in its closed position with respect to the open lower front of the lower machinery compartment 40 in the cabinet 11, since the interlock switch 46 is maintained in its closed position only when the lower front panel 70 occupies its closed position noted. Also, the carrying out of electronic cooking operations in the heating cavity 13 is conditioned upon maintaining the front door 20 in its closed position, so as to maintain the door switch 31 in its closed position in order to actuate the switch spring 224 into engagement with the switch spring 226, since the power supply to the input terminal 302 of the circuit 300 may be completed only when the door switch 31 occupies its closed position noted. Also, it is mentioned that when the front door 20 is operated into its open position, the door switch 31 is actuated to open the switch spring 224 from the switch spring 226 and to close the switch spring 224 to the switch spring 225. Closure of the switch spring 224 to the switch spring 225 in the door switch 31 completes a circuit including the conductors 227 and 221, as well as the contact bridging member 219, for illuminating the oven lamp 33 across the line conductor L2 and the neutral conductor N, which illumination of the oven lamp 33 is useful to the cook in viewing the interior of the heating cavity 13, incident to the placement and the removal of food with respect thereto.

Now considering the carrying out of an electronic cooking operation in the heating cavity 13 at the low rate of R.F. power supply thereto, the cook first places the food to be cooked into the heating cavity 13 and supported by the turntable 41 and then returns the front door 20 into its closed position. Next, the cook rotates the manual dial 233 of the power selector switch 230 from its "off" position into its "low" position, whereby the insulator 235 carried by the operation shaft 232 of the power selector switch 230 closes the switch spring 237 to the switch spring 236, thereby to connect the neutral conductor N to the conductor 242 and consequently to the input terminal 301 of the circuit 300. Finally, the cook determines the time interval during which the food is to be cooked and then rotates the manual dial 252 of the program controller 250 out of its "o" time position into its corresponding preset time position, such, for example, as the "10-min." position thereof. When the manual dial 252 of the program controller 250 is thus rotated into its preset time position, the insulating cam 254 closes the switch spring 261 to the switch spring 262 and the insulating cam 255 closes the switch spring 263 to the switch spring 264. Closure of the switch springs 261, 262 connects the conductor 221 to the conductor 245, thereby to complete an obvious circuit for operating the electric motor 105 for driving the fan 104 that is operatively associated with the magnetron device 101, so as to initiate cooling thereof, in the manner previously expalined. Also, the conductor 245 is connected via the magnetron thermostatic switch 190 in its closed position to the conductor 283, thereby completing a path including the closed switch springs 273 and 274 of the restored power relay 270 to the conductor 276; which path is extended via the resistor 287 and the contact 288 to the conductor 289, thereby to complete a circuit for energizing the lower section of the primary winding 331 of the cathode heater transformer 330. When the lower section of the primary winding 331 of the transformer 330 is thus energized, an a.c. voltage is induced into the secondary winding 332 thereof, thereby to complete a connection including the conductor 334 to the terminals 171 and 172 of the magnetron device 101 across which the cathode heater 131 is bridged; whereby the cathode heater 131 is heated so as to render electron-emissive the cathode 130 of the magnetron device 101.

Also, the application of potential to the conductor 283 completes an obvious circuit for energizing the winding of the time delay relay 265, whereby the latter relay begins to operate; and after a time interval of about 45 seconds, the time delay relay 265 operates fully, the delay in the full operation of the time delay relay 265 being effected by the dash pot 268 that is operatively associated with the switch spring 226. Upon full operation of the time delay relay 265, the switch spring 266 is closed to the switch spring 267, thereby to supply potential to the conductor 246. The application of potential to the conductor 246 completes an obvious circuit for energizing the timer motor 256 of the program controller 250, whereby the previously described timed operation of the program controller 250 is initiated, with the result that the manual dial 252 is returned step by step in the counterclockwise direction and ultimately back into its "0" time position.

Also, the connection of potential to the conductor 246, effects the connection of potential to the conductor 243, since the switch spring 263 engages the switch spring 264 at this time. The connection of potential to the conductor 243 completes an obvious circuit for operating the motor 44 so as to effect rotation of the turntable 41 in the manner previously explained, so that the supported food in the heating cavity 13 is rotated for a purpose more fully explained hereinafter. Also, the connection of potential to the conductor 243 completes an obvious circuit for illuminating the U.H.F. pilot lamp 293, thereby to indicate that the heating cvaity 13 is operating upon an electronic cooking basis at this time.

Finally, the connection of potential to the conductor 243 completes an obvious circuit for enegizing the winding of the power relay 270, thereby to cause the latter relay to operate. Upon operating the power relay 270 actuates the swithc spring 273 to disengage the switch spring 274, thereby to interrupt the previously traced circuit for energizing the lower section of the primary winding 331 of the transformer 330; and actuates the switch spring 273 into engagement with the switch spring 275 so as to complete an alternative circuit including the conductor 277, the resistor 284 and the contact 255, the conductor 286, the closed switch springs 281 and 282 and the conductor 291 for energizing the full primary winding 331 of the transformer 330. When the full primary winding 331 of the transformer 330 is thus energized, a lower a.c. voltage is induced in the secondary winding 332 thereof so as to decrease the heating current supplied to the cathode heater 131. Finally, upon operating the power relay 270 actuates the switch spring 271 to engage the switch spring 272, thereby to connect the conductor 229 to the conductor 292 and thus to the input terminal 302 of the circuit 300.

Accordingly, at this time, the input terminal 301 of the circuit 300 is connected to the netural conductor N and the input terminal 302 of the circuit 300 is connected to the line conductor L2, whereby the 118 volts of the Edison supply network is impressed across the input terminals 301 and 302, whereby the 290 volts d.c. is present across the output terminals 303 and 304 of the circuit 300 that are respectively connected to the B+ conductor and to the B− conductor. The B+ conductor is connected to the terminal 191 of the magnetron device 101 and thence via the conductor 193, the coil 120, the conductor 194, the coil 119 and the conductor 195 to the anode 127 of the magnetron device 101; while the B− conductor is connected directly to the terminal 171 of the magnetron device 101 and thus to the cathode 130 thereof. Accordingly, the 290 volts d.c. is impressed between the anode 127 and the cathode 130 of the magnetron device 101, whereby the same oscillates at the ultra-high frequency of 915 Mc and the coils 119 and 120 of the magnetron device 101 are energized in series relation in the plate circuit. Upon operating, the magnetron device 101 supplies the R.F. output to the output terminals 154 and 117 thereof; the output terminal 154 is capacitively coupled by the capacitor 341 to the inner conductor 81 of the transmission line 80; and the output terminal 117 is capacitively coupled by the capacitor 342 to the outer conductor 82 of the transmission line 80. As previously explained, the inner conductor 81 is connected to the antenna 36 and the outer conductor 82 is connected to the metal liner 12, whereby the R.F. energy is radiated by the antenna 36 into the heating cavity 13, with the result that decimeter standing waves are present in the heating cavity 13 and subject to electronic cooking the food that is supported by the rotating turntable 41. In the electric diagram of FIG. 9, the heating cavity load is represented at 13L as being connected between the antenna 36 and the metal liner 12, the metal liner 12 being connected to the grounded neutral conductor N. The rotation of the food undergoing the electronic cooking operation by the supporting turntable 41 distributes the electronic heating effects therein so as to cause substantial uniform cooking of the food in the heating cavity 13, notwithstanding spatial variations of the energy in the decimeter standing waves in the heating cavity 13.

The R.F. power is supplied at the low rate of about 100 watts from the magnetron device 101 into the heating cavity 13 at this time by virtue of the connection to the plate circuit of the relatively low d.c. voltage of 290 volts from the output terminals 303 and 304 of the circuit 300, since the power selector switch 230 occupies its "low" position at this time.

The electronic cooking operation continues under the control of the program controller 250; and at the expiration of the preset time interval of 10 minutes, the timer motor 256 returns the manual dial 252 back into its "0" time position; whereupon the insulating cam 254 actuates the switch spring 261 to disengage the switch spring 262 and the insulating cam 255 actuates the switch spring 263 to disengage the switch spring 264. Opening of the switch springs 261, 262 disconnects potential from the conductor 245, thereby to arrest operation of the fan motor 105, to deenergize the primary winding 331 of the cathode heater transformer 330, and to deenergize the winding of the time delay relay 265. Accordingly, the time delay relay 265 immediately restores to actuate the switch spring 266 to disengage the switch spring 267, thereby to remove potential from the conductors 246 and 243. The removal of potential from the conductor 243 interrupts the circuit for energizing the winding of the power relay 270 so as to cause the latter relay to restore. Also the removal of potential from the conductor 243 extinguishes the U.H.F. pilot lamp 293 and interrupts the circuit for operating the turntable motor 44. The removal of potential from the conductor 246 interrupts the circuit for operating the timer motor 256, thereby to arrest operation of the program controller 250 with the manual dial 252 in the "0" time position thereof. When the U.H.F. pilot lamp 293 is extenguished, it indicates that the heating cavity 13 is no longer operating upon an electronic heating basis.

Upon restoring, the power relay 270 actuates the switch spring 271 from engagement with the switch spring 272 thereby to interrupt the power supply to the circuit 300 and consequently the supply of d.c. power to the magnetron device 101, with the result that the magnetron device 101 stops oscillating and interrupts the supply of R.F. energy to the antenna 36 in the heating cavity 13. At this time, the electronic cooking operation at the low rate has been completed in the heating cavity 13.

Now considering the carrying out of an electronic cooking operation in the heating cavity 13 at the high rate of R.F. power supply thereto, the cook first places the food to be cooked into the heating cvaity 13 and supported by the turntable 41, and then returns the front door 20 into its closed position. Next, the cook rotates the manual dial 233 of the power selector switch 230 from its "off" position into its "high" position; whereby the insulator 235 carried by the operating shaft 232 of the power selector switch 230 closes the switch spring 238 to the switch spring 239 and closes the switch spring 240 to the switch spring 241. Closure of the switch spring 238 to the switch spring 239 connects the conductor 222 to the conductor 242 and thus connects the line conductor L1 to the input terminal 301 of the circuit 300. Finally, the cook determines the time interval during which the food is to be cooked and then rotates the manual dial 252 of the program controller 250 out of its "0" time position into its corresponding preset time position, such, for example, as the "10-min." position thereof. When the manual dial 252 of the program controller 250 is thus rotated into its preset time position, the insulating cam 254 closes the switch spring 261 to the switch spring 262 and the insulating cam 255 closes the switch spring 263 to the switch spring 264. Closure of the switch springs 261, 262 connects the conductor 221 to the conductor 245, thereby to complete an obvious circuit for operating the electric motor 105 for driving the fan 104 that is operatively associated with the magnetron device 101 so as to initiate cooling thereof in the manner previously explained. Also, the conductor 245 is connected via the magnetron thermostatic switch 190 in its closed position to the conductor 283, thereby completing a path including the closed switch springs 273 and 274 of the restored power relay 270 to the conductor 276; which path is extended via the resistor 287 and the contact 288 to the conductor 289, thereby to complete a circuit for energizing the lower section of the primary winding 331 of the cathode hater transformer 330. When the lower section of the primary winding 331 of the transformer 330 is thus energized, an a.c. voltage is induced into the secondary winding 332 thereof, thereby to complete a connection, including the conductor 334, to the terminals 171 and 172 of the mangetron device 101 across which the cathode heater 131 is bridged; whereby the cathode heater 131 is heated so as to render electron-emissive the cathode 130 of the magnetron device 101.

Also the application of potential to the conductor 283 completes an obvious circuit for energizing the winding of the time delay relay 265, whereby the latter relay begins to operate; and after a time interval of about 45 seconds, the time delay relay 265 operates fully, the delay in the full operation of the time delay relay 265 being effected by the dash pot 268 that is operatively associated with the switch spring 266. Upon full operation of the time delay relay 265, the switch spring 266 is closed to the switch spring 267, thereby to supply potential to the conductor 246. The application of potential to the conductor 246 completes an obvious circuit for energizing the timer motor 256 of the program controller 250, whereby the previously described timed operation of the program controller 250 is initiated, with the result that the manual dial 252 is returned step by step in the counterclockwise direction and ultimately back into its "0" time position.

Also, the connection of potential to the conductor 246 effects the connection of potential to the conductor 243, since the switch spring 263 engages the switch spring 264 at this time. The connection of potential to the conductor 243 completes an obvious circuit for operating the motor 44 so as to effect rotation of the turntable 41, in the manner previously explained, so that the supported food in the heating cavity 13 is rotated for a purpose more fully explained hereinafter. Also the connection of potential to the conductor 243 completes an obvious circuit for illuminating the U.H.F. pilot lamp 293, thereby to indicate that the heating cavity 13 is operating upon an electronic cooking basis at this time.

Further the connection of potential to the conductor 243 completes a path including the closed switch springs 240 and 241 for connecting potential to the conductor 244, thereby to complete an obvious circuit for energizing the winding of the cathode heater relay 280, so as to cause the latter relay to oeprate. Upon operating, the cathode heater relay 280 actuates the switch spring 281 to disengage the switch spring 282, so as to open a point in the circuit for energizing the full primary winding 331 of the cathode heater transformer 330, for a purpose more fully explained subsequently.

Finally, the connection of potential to the conductor 243 completes an obvious circuit for energizing the winding of the power relay 270, thereby to cause the latter relay to operate. Upon operating, the power relay 270 actuates the switch spring 273 to disengage the switch spring 274, thereby to interrupt the previously traced circuit for energizing the lower section of the primary winding 331 of the transformer 330; and actuates the switch spring 273 into engagement with the switch spring 275 so as to prepare an alternative circuit for energizing the full primary winding 331 of the transformer 330. However, the last mentioned circuit is not completed at this time, by virtue of the operated position of the cathode heater relay 280 actuating the switch spring 281 into disengagement with the switch spring 282. More particularly, the circuit mentioned for energizing the full primary winding 331 is not completed at this time by virtue of the "high" position of the power selector switch 230, since it is not necessary to energize the cathode heater 131 when the magnetron device 101 is operated at high power, as the cathode 130 is rendered electron-emissive at high power incident to normal operation thereof. Finally, upon operating the power relay 270 actuates the switch spring 271 to engage the switch spring 272, thereby to connect the conductor 229 to the conductor 292 and thus to the input terminal 302 of the circuit 300.

Accordingly, at this time, the input terminal 301 of the circuit 300 is connected to the line conductor L1 and the input terminal 302 of the circuit 300 is connected to the line conductor L2, whereby the 236 volts of the Edison supply network is impressed across the input terminals 301 and 302, whereby the 570 volts d.c. is present across the output terminals 303 and 304 of the circuit 300 that are respectively connected to the B+ conductor and the B− conductor. The B+ conductor is connected to the terminal 191 of the magnetron device 101 and thence via the conductor 193, the coil 120, the conductor 194, the coil 119 and the conductor 195 to the anode 127 of the magnetron device 101; while the B− conductor is connected directly to the terminal 171 of the magnetron device 101 and thus to the cathode 130 thereof. Accordingly, the 570 volts d.c. is impressed between the anode 127 and the cathode 130 of the magnetron device 101; whereby the same oscillates at the ultra-high frequency of 915 Mc and the coils 119 and 120 of the magnetron device 101 are energized in series relation in the plate circuit. Upon operating the magnetron device 101 supplies the R.F. output to the output terminals 154 and 117 thereof; the output terminal 154 is capacitively coupled by the capacitor 341 to the inner conductor 81 of the transmission line 80; and the output terminal 117 is capacitively coupled by the capacitor 342 to the outer conductor 82 of the transmission line 80. As previously explained, the inner conductor 81 is connected to the antenna 36 and the outer conductor 82 is connected to the metal liner 12, whereby the R.F. energy is radiated by the antenna 36 into the heating cavity 13, with the result that decimeter standing waves are present in the heating cavity 13 and subject to an electronic cooking action the food that is supported by the rotating turntable 41. In the electric diagram of FIG. 9, the heating cavity load is represented at 13L as being connected between the antenna 36 and the metal liner 12, the metal liner 12 being connected to the grounded neutral conductor N. The rotation of the food undergoing the electronic cooking operation by the supporting turntable 41 distributes the electronic heating effect therein so as to cause substantially uniform cooking of the food in the heating cavity 13, notwithstanding spatial variations of the energy in the decimeter standing waves in the heating cavity 13.

The R.F. power is supplied at the high rate of about 700 watts from the magnetron device 101 into the heating cavity 13 at this time by virtue of the connection to the plate circuit thereof to the relatively high d.c. voltage of 570 volts from the output terminals 303 and 304 of the circuit 300, since the power selector switch 230 occupies its "high" position at this time.

The electronic cooking operation continues under the control of the program controller 250; and at the expiration of the preset time interval of ten minutes, the timer motor 256 returns the manual dial 252 back into its "0" time position; whereupon the insulating cam 254 actuates the switch spring 261 to disengage the switch spring 262 and the insulating cam 255 actuates the switch spring 263 to disengage the switch spring 264. Opening of the switch springs 261, 262 disconnects potential from the conductor 245, thereby to arrest operation of the fan motor 105 and to deenergize the winding of the time delay relay 265. Accordingly, the time delay relay 265 immediately restores to actuate the switch spring 266 to disengage the switch spring 267, thereby to remove potential from the conductor 246. The removal of potential from the conductor 243 interrupts the circuits for energizing the windings of the power relay 270 and the cathode heater relay 280 so as to cause these relays to restore. Also the removal of potential from the conductor 243 extinguishes the U.H.F. pilot lamp 293 and interrupts the circuit for operating the turntable motor 44. The removal of potential from the conductor 246 interrupts the circuit for operating the timer motor 256, thereby to arrest operation of the program controller 250 with the manual dial 252 in the "0" time position thereof. When the U.H.F. pilot lamp 293 is extinguished, it indicates that the heating cavity 13 is no longer operating upon an electronic heating basis.

Upon restoring, the power relay 270 actuates the switch spring 271 from engagement with the switch spring 272, thereby to interrupt the power supply to the circuit 300 and consequently the supply of d.c. power to the magnetron device 101, with the result that the magnetron device 101 stops oscillating and interrupts the supply of the R.F. energy to the antenna 36 and the heating cavity 13. At this time, the electronic cooking operation at the high rate has been completed in the heating cavity 13.

The carrying out of the electronic cooking operations respectively at the low power rate and at the high power rate in the heating cavity 13, as described above, are conditioned upon the magnetron thermostatic switch 190 remaining in its closed position indicating that the magnetron device 101 is operating at a temperature within the normal range of operating temperatures thereof. More particularly, in the event of an abnormally high operating temperature of the magnetron device 101, notwithstanding the operation of the fan 104 by the fan motor 105 for the cooling purpose, the fins 113, 114 are heated to an abnormally high temperature, with the result that the magnetron thermostatic switch 190 is operated into its open position. More specifically, the thermostatic element 321 of the magnetron thermostatic switch 190 is moved to disengage the associated switch spring 322, thereby to disconnect the conductor 245 from the conductor 283. When potential is thus removed from the conductor 283, the previously traced circuit for energizing the winding of the time delay relay 265 is interrupted; whereby the latter relay restores. Upon restoring the time delay relay 265 actuates the switch spring 266 to disengage the switch spring 267, so as to effect the removal of potential from the conductor 246 and consequently from the conductor 243, notwithstanding the circumstance that the program controller 250 occupies a position other than its "0" time position. The removal of potential from the conductor 246 arrests operation of the timer motor 256 so as to arrest further return, at this time, of the program controller 250 back toward its "0" time position. The removal of potential from the conductor 243 interrupts the previously traced circuit for retaining operated the power relay 270; whereby the latter relay restores to actuate the switch spring 271 to disengage the switch spring 272 so as to interrupt the supply of power to the circuit 300, thereby to arrest operation of the magnetron device 101 and the consequent supply of R.F. energy to the heating cavity 13. Also, the removal of potential from the conductor 243 effects the restoration of the cathode heater relay 280, in the event the latter relay occupies its operated position, extinguishes the U.H.F. pilot lamp 293 and arrests operation of the turntable motor 44.

Since operation of the magnetron device 101 is arrested at this time, the temperature of the same subsides, whereby the magnetron thermostatic switch 190 is subsequently reoperated back into its closed position so as to effect the return of potential to the conductor 283. The return of potential to the conductor 283 again effects energization of the lower section of the primary winding 331 of the cathode heater transformer 330 and causes the time delay relay 265 to operate after the time delay of about 45 seconds, in the manner previously explained. Upon reoperating, the time delay relay 265 effects the return of potential upon the conductor 246 and consequently upon the conductor 243. The return of potential upon the conductor 246 initiates further operation of the timer motor 256 of the program controller 250. The return of potential upon the conductor 243 illuminates the U.H.F. pilot lamp 293, effects further operation of the turntable motor 44 and brings about reoperation of the power relay 270 and causes reoperation of the cathode heater relay 280, in the event the power selector switch 230 occupies its "high" position at this time. Upon reoperation, the power relay 270 actuates the switch spring 271 into engagement with the switch spring 272 so as to effect further operation of the circuit 300 and the consequent reoperation of the magnetron device 101 to supply R.F. energy to the heating cavity 13. Also, the power relay 270 actuates the switch spring 273 to disengage the switch spring 274 so as to interrupt the circuit for energizing the lower section of the primary winding 331 of the transformer 330. Further, the power relay 270 actuates the switch spring 273 to engage the switch spring 275, whereby the full primary winding 331 of the transformer 330 is energized, in the event the power selector switch 230 occupies its "low" position. On the other hand, in the event the power selector switch 230 occupies its "high" position, the operated cathode heater relay 280 prevents energization of the primary winding 331 of the transformer 330, in the manner previously explained.

The carrying out of the electronic cooking operations respectively at the low power rate and at the high power rate in the heating cavity 13, as described above, are conditioned upon the door switch 31 remaining in its closed position; and should the cook operate the front door 20 into its open position at this time, the door switch 31 is actuated to move the switch spring 224 into disengagement with the switch spring 226 so as to remove potential from the conductor 229. The removal of potential from the conductor 229 effects removal of potential from the conductor 246, and consequently from the conductor 243. The removal of potential from the conductor 246 arrests operation of the timer motor 256 so as to arrest further return at this time of the program controller 250 back toward its "0" time position. The removal of potential from the conductor 243 interrupts the previously traced circuit for retaining operated the power relay 270, whereby the latter relay restores to actuate the switch spring 271 to disengage the switch spring 272 so as to interrupt the supply of power to the circuit 300, thereby to arrest operation of the magnetron device 101 and the consequent supply of R.F. energy to the heating cavity 13. Also, the removal of potential from the conductor 243 effects the restoration of the cathode heater relay 280, in the event the latter relay occupies its operated position, extinguishes the U.H.F. pilot lamp 293 and arrests operation of the turntable motor 44.

Subsequently, when the cook returns the front door 20 back into its closed position, the door switch 31 is actuated so as to move the switch spring 224 into engagement with the switch spring 226, with the result that potential is returned upon the conductor 229, and consequently upon the conductors 246 and 243. The return of potential upon the conductor 246 initiates further operation of the timer motor 256 of the program controller 250. The return of potential upon the conductor 243 illuminates the U.H.F. pilot lamp 293, effects further operation of the turntable motor 44, and brings about reoperation of the power relay 270, and causes reoperation of the cathode heater relay 280, in the event the power selector switch 230 occupies its "high" position at this time. Upon reoperation, the power relay 270 actuates the switch spring 271 into engagement with the switch spring 272 so as to effect further operation of the circuit 300 and the consequent reoperation of the magnetron device 101 to supply R.F. energy to the heating cavity 13. Also, the power relay 270 actuates the switch spring 273 to disengage the switch spring 274 so as to interrupt the circuit for energizing the lower section of the primary winding 331 of the transformer 330. Further, the power relay 270 actuates the switch spring 273 to engage the switch spring 275, whereby the full primary winding 331 of the transformer 330 is energized, in the event the power selector switch 230 occupies its "low" position. On the other hand, in the event the power selector switch 230 occupies its "high" position, the operated cathode heater relay 280 prevents energization of the primary winding 331 of the transformer 330, in the manner previously explained.

At any time that it is necessary for the repairman to make inspection or adjustment of the apparatus housed in the lower machinery compartment 40, the lower front panel 70 may be removed so as to bring about operation of the interlock switch 46 into its open position so as positively to prevent operation of the circuit 300 and the magnetron device 101 at this time. Also, to insure that there is no residual voltage across the B+ conductor and the B− conductor, the repairman may actuate the shorting switch 314 into its closed position, thereby to short-circuit the anode 127 to the cathode 130 of the magnetron device 101 and to short-circuit the conductor 195 to the B− conductor and effectively to short-circuit through the coils 119 and 120 the B+ conductor to the B− conductor. Thereafter, when the repairman has made his inspection or adjustment of the apparatus housed in the lower machinery compartment 40, the short circuiting switch 314 is returned into its normal open position and the lower front panel 70 is returned into its normal position closing the open front of the lower machinery compartment 40, with the result that the interlock switch 46 is returned back into its closed position so as again to condition for further operation the circuit 300 and the magnetron device 101.

Alternatively, the shorting switch 314 may be interlocked with the hinge mechanism for the front door 20, so that when the front door 20 is moved into its open position, the shorting switch 314 is moved into its closed position, and so that when the front door 20 is moved into its closed position, the shorting switch 314 is moved into its open position. Of course, this arrangement positively prevents operation of the magnetron device 101 when the front door 20 occupies its open position. The construction and arrangement of the magnetron unit 100 is disclosed and claimed in the co-pending divisional application of James E. Staats, Ser. No. 283,355, filed May 27, 1963.

In view of the foregoing, it is apparent that there has been provided a control and power supply system for a magnetron device that is of improved connection and arrangement.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An ultra-high frequency generator comprising a magnetron including a pair of input terminals and a pair of output terminals, said magnetron being characterized by the production of an a.c. voltage of ultra-high frequency across the output terminals thereof in response to the application of a d.c. voltage across the input terminals thereof, a converter including a pair of input terminals and a pair of output terminals, said converter consisting essentially of an assembly of capacitors and rectifiers and being characterized by the production of a d.c. output voltage across the output terminals thereof in response to the application of a low frequency a.c. input voltage across the input terminals thereof, wherein the amplitudes of the d.c. output voltage from said converter is a multiple of the peak value of the a.c. input voltage to said converter, and connections between the output terminals of said converter and the input terminals of said magnetron.

2. An ultra-high frequency generator comprising a magnetron including a pair of input terminals and a pair of output terminals, said magnetron being characterized by the production of an a.c. voltage of ultra-high frequency across the output terminals thereof in response to the application of a d.c. voltage across the input terminals thereof, a converter including a pair of input terminals and a pair of output terminals, said converter consisting essentially of an assembly of capacitors and rectifiers and being characterized by the production of a d.c. output voltage across the output terminals thereof in response to the application of a low frequency a.c. input voltage across the input terminals thereof, wherein the amplitude of the d.c. output voltage from said converter is a multiple of the peak value of the a.c. input voltage to said circuit, connections between the output terminals of said converter and the input terminals of said magnetron, a low frequency a.c. supply source, and means for selectively connecting said supply source to the input terminals of said converter.

3. An ultra-high frequency generator comprising a magnetron including a pair of input terminals and a pair of output terminals, said magnetron being characterized by the production of an a.c. voltage of ultra-high frequency across the output terminals thereof in response to the application of a d.c. voltage across the input terminals thereof, a converter including a pair of input terminals and a pair of output terminals, said converter consisting essentially of an assembly of capacitors and rectifiers and being characterized by the production of a d.c. output voltage across the output terminals thereof in response to the application of a low frequency a.c. input voltage across the input terminals thereof, wherein the amplitude of the d.c. output voltage from said converter is approximately double the peak value of the a.c. input voltage to said converter, connections between the output terminals of said converter and the input terminals of said magnetron, a 3-wire Edison low frequency a.c. supply source including a pair of ungrounded line conductors provided with a corresponding pair of line terminals and a grounded neutral conductor provided with a corresponding neutral terminal, and switching apparatus having a first position connecting the line terminals of said supply source to the input terminals of said converter and a second position connecting one of the line terminals and the neutral terminal of said supply source to the input terminals of said converter.

4. The ultra-high frequency generator set forth in claim 3, wherein the line-to-line R.M.S. voltage of said supply source is in the general range 220 to 250 volts and the line-to-neutral R.M.S. voltage of said supply source is in the general range 110 to 125 volts.

5. Electronic heating apparatus comprising metal wall structure defining a heating cavity, an antenna electrically insulated from said wall structure and arranged to radiate microwaves into said heating cavity, a magnetron including a pair of input terminals and a pair of output terminals, said magnetron being characterized by the production of an a.c. voltage of ultra-high frequency across the output terminals thereof in response to the application of a d.c. voltage across the input terminals thereof, a first connection between one of the output terminals of said magnetron and said antenna, a second connection between the other of the output terminals of said magnetron and said wall structure, a converter including a pair of input terminals and a pair of output terminals, said converter consisting essentially of an assembly of capacitors and rectifiers and being characterized by the production of a d.c. output voltage across the output terminals thereof in response to the application of a low frequency a.c. input voltage across the input terminals thereof, wherein the amplitude of the d.c. output voltage from said converter is a multiple the peak value of the a.c. input voltage to said converter, and connections between the output terminals of said converter and the input terminals of said magnetron.

6. Electronic heating apparatus comprising metal wall structure defining a heating cavity, an antenna electrically insulated from said wall structure and arranged to radiate microwaves into said heating cavity, a magnetron including a pair of input terminals and a pair of output terminals, said magnetron being characterized by the production of an a.c. voltage of ultra-high frequency across the output terminals thereof in response to the application of a d.c. voltage across the input terminals thereof, a first capacitive coupling between one of the output terminals of said magnetron and said antenna, a second capacitive coupling between the other of the output terminals of said magnetron and said wall structure, a converter including a pair of input terminals and a pair of output terminals, said converter consisting essentially of an assembly of capacitors and rectifiers and being characterized by the production of a d.c. output voltage across the output terminals thereof in response to the application or a low frequency a.c. input voltage across the input terminals thereof, wherein the amplitude of the d.c. output voltage from said converter is a multiple of the peak value of the a.c. input voltage to said converter, and connections between the output terminals of said converter and the input terminals of said magnetron.

7. Electronic heating apparatus comprising metal wall structure defining a heating cavity, a magnetron including a pair of input terminals and a pair of output terminals, said magnetron being characterized by the production of an a.c. voltage of ultra-high frequency across the output terminals thereof in response to the application of a d.c. voltage across the input terminals thereof, means connected to the output terminals of said magnetron for supplying microwave into said heating vacity, a power supply circuit including a pair of input terminals and a pair of output terminals, said circuit being characterized by the production of a d.c. output voltage across the output terminals thereof in response to the application of a low frequency a.c. input voltage across the input terminals thereof, connections between the output terminals of said circuit and the input terminals of said magnetron, a low frequency a.c. supply source, a power switch having a closed position connecting said supply source to the input terminals of said circuit and an open position disconnecting said supply source from the input terminals of said circuit, a manually-settable timer-operated program controller having stop and run positions, means governed by said program controller in its run position for operating said power switch into its closed position and governed by said program controller in its stop position for operating said power switch into its open position, a thermostatic switch operatively associated with said magnetron, and means governed by said thermostatic switch in response to an abnormally high temperature of said magnetron for operating said power switch into its open position notwithstanding the possible run position of said programmer controller.

8. Electronic heating apparatus comprising metal wall structure defining a heating cavity, a magnetron including a pair of input terminals and a pair of output terminals, said magnetron being characterized by the production of an a.c. voltage of ultra-high frequency across the output terminals thereof in response to the application of a d.c. voltage across the input terminals thereof, means connected to the output terminals of said magnetron for supplying microwaves into said heating cavity, a power supply circuit including a pair of input terminals and a pair of output terminals, said circuit being characterized by the production of a d.c. output voltage across the output terminals thereof in response to the application of a low frequency a.c. input voltage across the input terminals thereof, connections between the output terminals of said circuit and the input terminals of said magnetron, a low frequency a.c. supply source, a power switch having a closed position connecting said supply source to the input terminals of said circuit and an open position disconnecting said supply source from the input terminals of said circuit, a manually-settable timer-operated program controller having stop and run positions, a fan operative to direct a stream of cooling fluid into heat-exchange relation with said magnetron, means governed by said program controller in its run position for operating said power switch into its closed position and for initiating operation of said fan and governed by said program controller in its stop position for operating said power switch into its open position and for arresting operation of said fan, a thermostatic switch operatively associated with said magnetron, and means governed by said thermostatic switch in response to an abnormally high temperature of said magnetron for operating said power switch into its open position notwithstanding the possible run position of said program controller.

9. Electronic heating apparatus comprising metal wall structure defining a heating cavity, a megnetron including a pair of input terminals and a pair of output terminals, said magnetron being characterized by the production of an a.c. voltage of ultra-high frequency across the output terminals thereof in response to the application of a d.c. voltage across the input terminals thereof, means connected to the output terminals of said magnetron for supplying microwaves into said heating cavity, a power supply circuit including a pair of input terminals and a pair of output terminals, said circuit being characterized by the production of a d.c. output voltage across the output terminals thereof in response to the application of a low frequency a.c. input voltage across the input terminals thereof, connections between the output terminals of said circuit and the input terminals of said magnetron, a low frequency a.c. supply source, a power switch having a closed position connecting said supply source to the input terminals of said circuit and an open position disconnecting said supply source from the input terminals of said circuit, a program controller having a stop position and a variable run position, manual means for selectively setting said program controller from its stop position into its variable run position, thereby correspondingly to preset a variable time interval into said program controller, a timer motor operative to return said program controller from its variable run position back into its stop position during a time interval corresponding to that preset therein, a time delay relay, means responsive to setting of said program controller into its run position for initiating operation of said time delay relay, whereby said time delay relay is fully operated a short time interval thereafter, means responsive to full operation of said time delay relay for initiating operation of said timer motor, means responsive to the return of said program controller back into its stop position for restoring said time delay relay and for arresting operation of said timer motor, and means governed jointly by said program controller in its run position and by said time delay relay in its fully operated position for operating said power switch into its closed position and governed either by said program controller in its stop position or by said time delay relay in other than its fully operated position for operating said power switch into its open position.

10. Electronic heating apparatus comprising metal wall structure defining a heating cavity, a magnetron including a pair of input terminals and a pair of output terminals, said magnetron being characterized by the production of an a.c. voltage of ultra-high frequency across the output terminals thereof in response to the application of a d.c. voltage across the input terminals thereof, means connected to the output terminals of said magnetron for supplying microwaves into said heating cavity, a power supply circuit including a pair of input terminals and a pair of output terminals, said circuit being characterized by the production of a d.c. output voltage across the output terminals thereof in response to the application of a low frequency a.c. input voltage across the input terminals thereof, connections between the output terminals of said circuit and the input terminals of said magnetron, a low frequency a.c. supply source, a power switch having a closed position connecting said supply source to the input terminals of said circuit and an open position disconnecting said supply source from the input terminals of said circuit, a program controller having a stop position and a variable run position, manual means for selectively setting said program controller from its stop position into its removable run position, thereby correspondingly to preset a variable time interval into said program controller, a timer motor operative to return said program controller from its variable run position back into its stop position during a time interval corresponding to that preset therein, a time delay relay, means responsive to setting of said program controller into its run position for initiating operation of said time delay relay, whereby said time delay relay is fully operated a short time interval thereafter, means responsive to full operation of said time delay relay for initiating operation of said timer motor, means responsive to the return of said program controller back into its stop position for restoring said time delay relay and for arresting operation of said timer motor, means governed jointly by said program controller in its run position and by said time delay relay in its fully operated position for operating said power switch into its closed position and governed either by said program controller in its stop position or by said time delay relay in other than its fully operated position for operating said power switch into its open position, a thermostatic switch operatively associated with said magnetron, and means governed by said thermostatic switch in response to an abnormally high temperature of said magnetron for restoring said time delay relay notwithstanding the possible run position of said program controller.

11. Electronic heating apparatus comprising metal wall structure defining a heating cavity, a magnetron including a pair of input terminals and a pair of output terminals, said magnetron being characterized by the production of an a.c. voltage of ultra-high frequency across the output terminals thereof in response to the application of a d.c. voltage across the input terminals thereof, means connected to the output terminals of said magnetron for supplying microwaves into said heating cavity, a power supply circuit including a pair of input terminals and a pair of output terminals, said circuit being characterized by the production of a d.c. output voltage across the output terminals thereof in response to the application of a low frequency a.c. input voltage across the input terminals thereof, connections between the output terminals of said circuit and the input terminals of said magnetron, a low frequency a.c. supply source, a power switch having a closed position connecting said supply source to the input terminals of said circuit and an open position disconnecting said supply source from the input terminals of said circuit, a program controller having a stop position and a variable run position, manual means for selectively setting said program controller from its stop position into its variable run position, thereby correspondingly to preset a variable time interval into said program controller, a timer motor operative to return said program controller from its variable run position back into its stop position during a time interval corresponding to that preset therein, a fan operative to direct a stream of cooling fluid into heat-exchange relation with said magnetron, a time delay relay, means responsive to setting of said program controller into its run position for initiating operation of said fan and for initiating operation of said time delay relay, whereby said time delay relay is fully operated a short time interval thereafter, means responsive to full operation of said time delay relay for initiating operation of said timer motor, means responsive to the return of said program controller back into its stop position for arresting operation of said fan and for restoring said time delay relay and for arresting operation of said timer motor, and means governed jointly by said program controller in its run position and by said time delay relay in its fully operated position for operating said power switch into its closed position and governed either by said program controller in its stop position or by said time delay relay in other than its fully operated position for operating said power switch into its open position.

12. Electronic heating apparatus comprising metal wall structure defining a heating cavity, a magnetron including a pair of input terminals and a pair of output terminals, said magnetron being characterized by the production of an a.c. voltage of ultra-high frequency across the output terminals thereof in response to the application of a d.c. voltage across the input terminals thereof, means connected to the output terminals of said magnetron for supplying microwaves into said heating cavity, a power supply circuit including a pair of input terminals and a pair of output terminals, said circuit being characterized by the production of a d.c. output voltage across the output terminals thereof in response to the application of a low frequency a.c. input voltage across the input terminals thereof, connections between the output terminals of said circuit and the input terminals of said magnetron, a low frequency a.c. supply source, a power switch having a closed position connecting said supply source to the input terminals of said circuit and an open position disconnecting said supply source from the input terminals of said circuit, a program controller having a stop position and a variable run position, manual means for selectively setting said program controller from its stop position into its variable run position, thereby correspondingly to preset a variable time interval into said program controller, a timer motor operative to return said program controller from its variable run position back into its stop position during a time interval corresponding to that preset therein, a fan operative to direct a stream of cooling fluid into heat-exchange relation with said magnetron, a time delay relay, means responsive to setting of said program controller into its run position for initiating operation of said fan and for initiating operation of said time delay relay, whereby said time delay relay is fully operated a short time interval thereafter, means responsive to full operation of said time delay relay for initiating operation of said timer motor, means responsive to the return of said program controller back into its stop position for arresting operation of said fan and for restoring said time delay relay and for arresting operation of said timer motor, means governed jointly by said program controller in its run position and by said time delay relay in its fully operated position for operating said power switch into its closed position and governed either by said program controller in its stop position or by said time delay relay in other than its fully operated position for operating said power switch into its open position, a thermostatic switch operatively associated with said magnetron, and means governed by said thermostatic switch in response to an abnormally high temperature of said magnetron for restoring said time delay relay notwithstanding the possible run position of said program controller.

13. Electronic heating apparatus comprising metal wall structure defining a heating cavity, a magnetron including a pair of input terminals and a pair of output terminals, said magnetron being characterized by the production of an a.c. voltage of ultra-high frequency across the output terminals thereof in response to the application of a d.c. voltage across the input terminals thereof, said magnetron being further characterized by an ultra-high frequency power output from the output terminals thereof that is generally proportional to the amplitude of the d.c. voltage applied across the input terminals thereof, means connected to the output terminals of said magnetron for supplying microwaves into said heating cavity, a power supply circuit including a pair of input terminals and a pair of output terminals, said circuit being characterized by the production of a d.c. output voltage across the output terminals thereof in response to the application of a low frequency a.c. input voltage across the input terminals thereof, said circuit being further characterized by a d.c. output voltage across the output terminals thereof that is generally proportional to the amplitude of the a.c. input voltage applied across the input terminals thereof, connections between the output terminals of said circuit and the input terminals of said magnetron, a first low frequency a.c. supply source of relatively low voltage, a second low frequency a.c. supply source of relatively high voltage, a manually operable control switch having a first position selecting said first supply source and a second position selecting said second supply source, a power switch having a closed position connecting the selected one of said supply sources to the input terminals of said circit and an open position disconnecting the selected one of said supply sources to the input terminals of said circuit, and means for selectively operating said power switch between its open and closed positions, whereby operation of said control switch into its first position preselects a relatively low electronic heating rate for said heating cavity and operation of said control switch into its second position preselects a relative high electronic heating rate for said heating cavity.

14. The electronic heating apparatus set forth in claim 13, wherein aid first a.c. supply source has a frequency of about 60 cycles and a R.M.S. voltage in the general range 110 to 125 volts, and said second a.c. supply source has a frequency of about 60 cycles and a R.M.S. voltage in the general range 220 to 250volts.

15. The electronic heating apparatus set forth in claim 13, wherein said first and second a.c. supply sources are derived from a single-phase 3-wire Edison supply network.

16. In an apparatus for dielectric heating, by means of micro-waves, metal means forming an oven space, a magnetron type micro-wave generator, a transmission line for micro-waves coupling said micro-wave generator to said oven space and comprising a capacitive member constituting a galvanic insulation between said oven space and said micro-wave generator; a voltage converter coupled to said micro-wave generator and to a main electric supply system, said converter comprising a galvanic connection inter-connecting said microwave generator and said electric supply system; a grounded, protective casing for said micro-wave generator and said voltage converter, cooling means for said micro-wave generator; and supporting means carrying said micro-wave generator and insulating it galvanically from said protective casing.

17. An ultra-high frequency generator comprising a crossed-field discharge device including a pair of input terminals and a pair of output terminals, said device being characterized by the production of an a.c. voltage of ultra-high frequency across the output terminals thereof in response to the applicaton of a d.c. voltage across the input terminals thereof, a low frequency a.c. supply source including a pair of line conductors provided with a corresponding pair of line terminals having an R.M.S. voltage in the general range 220 to 250 volts therebetween, and a converter including a pair of input terminals respectively connected to said line terminals and a pair of output terminals respectively connected to the input terminals of said device, said converter consisting essentially of an assembly of capacitors and rectifiers and being characterized by the production of a d.c. output voltage across the output terminals thereof in response to the application of a low frequency a.c. input voltage across the input terminals thereof, wherein the amplitude of the d.c. output voltage from said converter is approximately double the peak value of the a.c. input voltage to said converter, said converter providing galvanic connections between the input terminals of said device and one of said line terminals.

18. An ultra-high frequency generator comprising a crossed-field discharge device including a pair of input terminals and a pair of output terminals, said device being characterized by the production of an a.c. voltage of ultra-high frequency across the output terminals thereof in response to the application of a d.c. voltage across the input terminals thereof, a low frequency a.c. supply source including a pair of line conductors provided with a corresponding pair of line terminals having an R.M.S. voltage in the general range 220 to 250 volts therebetween, a converter including a pair of input terminals respectively connected to said line terminals and a pair of output terminals respectively connected to the input terminals of said device, said converter consisting essentially of an assembly of capacitors and rectifiers and being characterized by the production of a d.c. output voltage across the output terminals thereof in response to the application of a low frequency a.c. input voltage across the input terminals thereof, wherein the amplitude of the d.c. output voltage from said converter is approximately double the peak value of the a.c. input voltage to said converter, said converter providing galvanic connections between the input terminals of said device and one of said line terminals, a protective casing disposed about and completely enclosing both said device and said converter, and insulators disposed between said protective casing and both said device and said converter and insulating both said device and said converter galvanically from said protective casing.

19. An ultra-high frequency generator comprising a crossed-field discharge device including a pair of input terminals and a pair of output terminals, said device being characterized by the production of an a.c. voltage of ultra-high frequency across the output terminals thereof in response to the application of a d.c. voltage across the input terminals thereof, a 3-wire Edison low frequency a.c. supply source including a neutral conductor and a pair of outside line conductors provided with a corresponding pair of line terminals having an R.M.S. voltage in the general range 220 to 250 volts therebetween, a converter including a pair of input terminals respectively connected to said line terminals and a pair of output terminals respectively connected to the input terminals of said device, said converter consisting essentially of an assembly of capacitors and rectifiers and being characterized by the production of a d.c. output voltage across the output terminals thereof in response to the application of a low frequency a.c. input voltage across the input terminals thereof, wherein the amplitude of the d.c. output voltage from said converter is approximately double the peak value of the a.c. input voltage to said converter, said converter providing galvanic connections between the input terminals of said device and one of said line terminals, an output coaxial transmission line including an inner conductor having an outer annular conductor disposed therearound, means capacitively coupling said inner and outer conductors respectively to the output terminals of said devices and providing a galvanic insulation between said transmission line and said device, and means connecting said outer conductor to said neutral conductor.

20. An ultra-high frequency generator comprising a crossed-field discharge device including a pair of input terminals and a pair of output terminals, said device being characterized by the production of an a.c. voltage of ultra-high frequency across the output terminals thereof in response to the application of a d.c. voltage across the input terminals thereof, a 3-wire Edison low frequency a.c. supply source including a grounded neutral conductor and a pair of outside line conductors provided with a corresponding pair of line terminals having an R.M.S. voltage in the general range 220 to 250 volts therebetween, a converter including a pair of input terminals respectively connected to said line terminals and a pair of output terminals respectively connected to the input terminals of said device, said converter consisting essentially of an assembly of capacitors and rectifiers and being characterized by the production of a d.c. output voltage across the output terminals thereof in response to the application of a low frequency a.c. input voltage across the input terminals thereof, wherein the amplitude of the d.c. output voltage from said converter is approximately double the peak value of the a.c. input voltage to said converter, said converter providing galvanic connections between the input terminals of said device and one of said line terminals, a protective casing disposed about and completely enclosing both said device and said converter, insulators disposed between said protective casing and both said device and said converter and insulating both said device and said converter galvanically from said protective casing, an output coaxial transmission line including an inner conductor having an outer annular conductor disposed therearound, means capacitively coupling said inner and outer conductors respectively to the output terminals of said devices and providing a galvanic insulation between said transmission line and said device, and means connecting both said protective casing and said outer conductor to said grounded neutral conductor.

21. Electronic heating apparatus comprising metal wall structure defining a heating cavity, an antenna galvanically insulated from said wall structure and arranged to radiate microwaves into said heating cavity, a crossed-field discharge device including a pair of input terminals and a pair of output terminals, said device being characterized by the production of an a.c. voltage of ultra-high frequency across the output terminals thereof in response to the application of a d.c. voltage across the inputs terminals thereof, a coaxial transmission line including an inner conductor and an outer annular conductor disposed therearound, means including a pair of capacitive couplers interconnecting said inner conductor between one of said output terminals and said antenna and interconnecting said outer conductor between the other of said output terminals and said metal wall structure, a 3-wire Edison low frequency a.c. supply source including a grounded neutral conductor and a pair of outside line conductors provided with a corresponding pair of line terminals having an R.M.S. voltage in the general range 220 to 250 volts therebetween, a converter including a pair of input terminals respectively connected to said line terminals and a pair of output terminals respectively connected to the input terminals of said device, said converter consisting essentially of an assembly of cspacitors and rectifiers and being characterized by the production of a d.c. output voltage across the output terminals thereof in response to the application of a low frequency a.c. input voltage across the input terminals thereof, wherein the amplitude of the d.c. output voltage from said converter is approximately double the peak value of the a.c. input voltage to said converter, said converter providing galvanic connections between the input terminals of said device and one of said line terminals, and means connecting said metal wall structure to said grounded neutral conductor.

22. The electronic heating apparatus set forth in claim 21, wherein said outer conductor is galvanically connected to said metal wall structure and is capacitively coupled to the adjacent one of said output terminals, and said means connecting said metal wall structure to said grounded neutral conductor also connects said outer conductor to said grounded neutral conductor.

23. The electronic heating apparatus set forth in claim 21, and further comprising a protective casing disposed about and completely enclosing both said device and said converter, insulators disposed between said protective casing and both said device and said converter and insulating both said device and said converter galvanically from said protective casing, and means connecting said protective casing to said grounded neutral conductor.

24. The electronic heating apparatus set forth in claim 23, and further comprising means for circulating a cooling fluid through said protective casing and over said device for effecting cooling of said device.

25. An ultra-high frequency generator comprising a crossed-field discharge device including a pair of input terminals and a pair of output terminals, said device being characterized by the production of an a.c. voltage of ultra-high frequency across the output terminals thereof in response to the application of a d.c. voltage across the input terminals thereof, a low frequency a.c. supply source including a pair of line conductors provided with a corresponding pair of line terminals having an a.c. voltage therebetween, and a converter including a pair of input terminals respectively connected to said line terminals and a pair of output terminals respectively connected to the input terminals of said device, said converter being characterized by the production of a d.c. output voltage across the output terminals thereof in response to the application of a low frequency a.c. input voltage across the input terminals thereof, wherein the amplitude of the d.c. output voltage from said converter is a multiple of the peak value of the a.c. input voltage to said converter, said converter providing galvanic connections between the input terminals of said device and one of said line terminals.

26. An ultra-high frequency generator comprising a crossed-field discharge device including a pair of input terminals and a pair of output terminals, said device being characterized by the production of an a.c. voltage of ultra-high frequency across the output terminals thereof in response to the application of an input voltage across the input terminals thereof, a low frequency a.c. supply source including a pair of line conductors provided with a corresponding pair of line terminals having an a.c. voltage therebetween, means interconnecting the input terminals of said device and said line terminals and providing galvanic connections between the input terminals of said device and at least one of said line terminals, an output coaxial transmission line including an inner conductor having an outer annular conductor disposed therearound, means capacitively coupling said inner and outer conductors respectively to the output terminals of said device and providing a galvanic insulation between said transmission line and said device, and means connecting said outer conductor to ground potential.

27. Electronic heating apparatus comprising wall structure defining a heating cavity, and an antenna galvanically insulated from said wall structure and arranged to radiate microwaves into said heating cavity, a crossed-field discharge device including a pair of input terminals and a pair of output terminals, sai device being characterized by the production of an a.c. voltage of ultra-high frequency across the output terminals thereof in response to the application of an input voltage across the input terminals thereof, means capacitively coupling one of said output terminals to said antenna, means capacitively coupling the other of said output terminals to said metal wall structure, a low frequency a.c. supply source including a pair of line conductors provided with a corresponding pair of line terminals having an a.c. voltage therebetween means interconnecting the input terminals of said device and said line terminals and providing galvanic connections between the input terminals of said device and at least one of said line terminals, and means connecting said metal wall structure to ground potential.

28. Electronic heating apparatus comprising wall structure defining a heating cavity, and an antenna galvanically insulated from said wall structure and arranged to radiate microwaves into said heating cavity, a crossed-field discharge device including a pair of input terminals and a pair of output terminals, said device being characterized by the production of an a.c. voltage of ultra-high frequency across the output terminals thereof in response to the application of an input voltage across the input terminals thereof, means capacitively coupling one of said output terminals to said antenna, means capacitively coupling the other of said output terminals to said metal wall structure, a low frequency a.c. supply source including a pair of line conductors provided with a corresponding pair of line terminals having an a.c. voltage therebetween, a converter including a pair of input terminals respectively connected to said line terminals and a pair of output terminals respectively connected to the input terminals of said device, said converter being characterized by the production of a d.c. output voltage across the output terminals thereof in response to the application of a low frequency a.c. input voltage across the input terminals thereof, wherein the amplitude of the d.c. output voltage from said voltage from said converter is a multiple of the peak value of the a.c. input voltage to said a.c. converter, said converter providing galvanic connections between the input terminals of said device and one of said line terminals, and means connecting said metal wall structure to ground potential.

29. An ultra-high frequency generator comprising a crossed-field discharge device including a pair of input terminals and a pair of output terminals, said device being characterized by the production of an a.c. voltage of ultra-high frequency across the output terminals thereof in response to the application of a d.c. voltage across the input terminals thereof, a low frequency a.c. supply source including a pair of line conductors provided with a corresponding pair of line terminals having an a.c. voltage therebetween, a converter including a pair of input terminals respectively connected to said line terminals and a pair of output terminals respectively connected to the input terminals of said device, said converter being characterized by the production of a d.c. output voltage across the output terminals thereof in response to the application of a low frequency a.c. input voltage across the input terminals thereof, wherein the amplitude of the d.c. output voltage from said converter is a multiple of the peak value of the a.c. input voltage to said converter, said converter providing galvanic connections between the input terminals of said device and one of said line terminals, a protective casing disposed about and completely enclosing both said device and said converter, and insulators disposed between said protective casing and said device and said converter and galvanically insulating said device and said converter from said protective casing.

30. An ultra-high frequency generator comprising a crossed-field discharge device including a pair of input terminals and a pair of output terminals, said device being characterized by the production of an a.c. voltage of ultra-high frequency across the output terminals thereof in response to the application of a d.c. voltage across the input terminals thereof, a protective casing disposed about and completely enclosing said device, insulators disposed between said protective casing and said device and galvanically insulating said device from said protective casing, a low frequency a.c. supply source including a pair of line conductors provided with a corresponding pair of line terminals having an a.c. voltage therebetween, and a converter including a pair of input terminals respectively connected to said line terminals and a pair of output terminals respectively connected to the input terminals of said device, said converter being characterized by the production of a d.c. output voltage across the output terminals thereof in response to the application of a low frequency a.c. input voltage across the input terminals thereof, wherein the amplitude of the d.c. output voltage from said converter is a multiple of the peak value of the a.c. input voltage to said converter, said converter providing galvanic connections between the input terminals of said device and one of said line terminals.

31. An ultra-high frequency generator comprising a crossed-field discharge device including a pair of input terminals and a pair of output terminals, said device being characterized by the production of an a.c. voltage of ultra-high frequency across the output terminals thereof in response to the application of a d.c. voltage across the input terminals thereof, a first protective casing disposed about and completely enclosing said device, insulators disposed between said first protective casing and said device galvanically insulating said device from said first protective casing, a low frequency a.c. supply source including a pair of line conductors provided with a corresponding pair of line terminals having an a.c. voltage therebetween, and a converter including a pair of input terminals respectively connected to said line terminals and a pair of output terminals respectively connected to the input terminals of said device, said converter being characterized by the production of a d.c. output voltage across the output terminals thereof in response to the application of a low frequency a.c. input voltage across the input terminals thereof, wherein the amplitude of the d.c. output voltage from said converter is a multiple of the peak value of the a.c. input voltage to said converter, said converter providing galvanic connections between the input terminals of said device and one of said line terminals, a second protective casing disposed about and completely enclosing said first protective casing and said converter, insulators disposed between said second protective casing and said converter and insulating said converter galvanically from said second protective casing, and means galvanically interconnecting said first protective casing to said second protective casing and to ground potential.

32. Electronic heating apparatus comprising wall structure defining a heating cavity, and an antenna galvanically insulated from said wall structure and arranged to radiate microwaves into said heating cavity, a crossed-field discharge device including a pair of input terminals and a pair of output terminals, said device being characterized by the production of an a.c. voltage of ultra-high frequency across the output terminals thereof in response to the application of an input voltage across the input terminals thereof, means capacitively coupling one of said output terminals to said antenna, means capacitively coupling the other of said output terminals to said metal wall structure, a low frequency a.c. supply source including a pair of line conductors provided with a corresponding pair of line terminals having an a.c. voltage therebetween, a converter including a pair of input terminals respectively connected to said line terminals and a pair of output terminals respectively connected to the input terminals of said device, said converter being characterized by the production of a d.c. output voltage across the output terminals thereof in response to the application of a low frequency a.c. input voltage across the input terminals thereof, wherein the amplitude of the d.c. output voltage from said voltage from said converter is a multiple of the peak value of the a.c. input voltage to said a.c.

converter, said converter providing galvanic connections between the input terminals of said device and one of said line terminals, and a protective casing disposed about and completely enclosing said device and said converter and said metal wall structure, insulators disposed between said protective casing and said device and said converter and insulating said device and said converter galvanically from said protective casing, and means connecting said protective casing to ground potential.

33. Electronic heating apparatus comprising wall structure defining a heating cavity, and an antenna galvanically insulated from said wall structure and arranged to radiate microwaves into said heating cavity, a crossed-field discharge device including a pair of input terminals and a pair of output terminals, said device being characterized by the production of an a.c. voltage of ultra-high frequency across the output terminals thereof in response to the application of an input voltage across the input terminals thereof, means capacitively coupling one of said output terminals to said antenna, means capacitively coupling the other of said output terminals to said metal wall structure, a first protective casing disposed about and completely enclosing said device, insulators disposed between said first protective casing and said device and galvanically insulating said device from said first protective casing, a low frequency a.c. supply source including a pair of line conductors provided with a corresponding pair of line terminals having an a.c. voltage therebetween, a converter including a pair of input terminals respectively connected to said line terminals and a pair of output terminals respectively connected to the input terminals of said device, said converter being characterized by the production of a d.c. output voltage across the output terminals thereof in response to the application of a low frequency a.c. input voltage across the input terminals thereof, wherein the amplitude of the d.c. output voltage from said voltage from said converter is a multiple of the peak value of the a.c. input voltage to said a.c. converter, said converter providing galvanic connections between the input terminals of said device and one of said line terminals, a second protective casing disposed about and completely enclosing said first protective casing and said device and said metal wall structure, insulators disposed between said second protective casing and said converter and insulating said converter galvanically from said second protective casing, and means galvanically interconnecting said first protective casing to said second protective casing and to ground potential.

* * * * *